United States Patent
Mishra et al.

(10) Patent No.: US 11,296,899 B2
(45) Date of Patent: Apr. 5, 2022

(54) REDUNDANT MULTICAST TREES WITHOUT DUPLICATION AND WITH FAST RECOVERY

(71) Applicant: Cisco Technology, Inc., San Jose, CA (US)

(72) Inventors: Mankamana Prasad Mishra, Dublin, CA (US); Jayashree Subramanian, Cary, NC (US); Stig Ingvar Venaas, Oakland, CA (US); Rishabh Parekh, San Jose, CA (US); Ravindran Rajarao, Fremont, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 57 days.

(21) Appl. No.: 16/289,455

(22) Filed: Feb. 28, 2019

(65) Prior Publication Data
US 2020/0280455 A1 Sep. 3, 2020

(51) Int. Cl.
| | |
|---|---|
| *H04L 12/18* | (2006.01) |
| *H04L 12/761* | (2013.01) |
| *H04L 12/773* | (2013.01) |
| *H04L 45/16* | (2022.01) |
| *H04L 45/60* | (2022.01) |

(52) U.S. Cl.
CPC ............ *H04L 12/185* (2013.01); *H04L 45/16* (2013.01); *H04L 45/60* (2013.01)

(58) Field of Classification Search
None
See application file for complete search history.

(56) References Cited

U.S. PATENT DOCUMENTS

| | | |
|---|---|---|
| 2009/0161670 A1 | 6/2009 | Shepherd et al. |
| 2013/0121142 A1* | 5/2013 | Bai ..................... H04L 45/28 370/228 |

(Continued)

FOREIGN PATENT DOCUMENTS

EP 3322141 A1 5/2018

OTHER PUBLICATIONS

International Search Report and Written Opinion from the International Searching Authority, dated May 14, 2020, 10 pages, for corresponding International Patent Application No. PCT/US2020/020182.

*Primary Examiner* — Hong Shao
(74) *Attorney, Agent, or Firm* — Polsinelli PC

(57) ABSTRACT

In an example method for redundant multicast trees with fast recovery, a protocol independent multicast (PIM) backup designated router (BDR) can receive a request from a host to join a multicast group associated with a source; send to a next hop a PIM join message identifying an address of the PIM BDR and identifying the PIM join message as a backup PIM join; receive, from a PIM router along a path to/from the source, a unicast message sent to the address which identifies a second address associated with the PIM router; store the second address and a route associated with the unicast message; in response to a designated router migration trigger, set to blocking a backup multicast tree state associated with the source and multicast group; and send, to the PIM router, a unicast message including instructions to set to blocking a backup multicast tree state at the PIM router.

20 Claims, 15 Drawing Sheets

(56) References Cited

U.S. PATENT DOCUMENTS

| | | | |
|---|---|---|---|
| 2015/0085862 A1* | 3/2015 | Song | H04L 12/4633 370/390 |
| 2017/0126587 A1* | 5/2017 | Ranns | H04L 47/825 |
| 2019/0007225 A1* | 1/2019 | Nagarajan | H04L 12/185 |

* cited by examiner

REDUNDANT MULTICAST TREES WITHOUT DUPLICATION AND WITH FAST RECOVERY

TECHNICAL FIELD

The present technology pertains to multicast routing, and more specifically to implementing redundant multicast trees with fast recovery for multicast routing.

BACKGROUND

Traditional Internet Protocol (IP) communication allows a host to send packets to a single destination through unicast transmission or broadcast packets to an entire network segment through broadcast transmission. In addition, IP multicast technologies allow a host to send packets to a subset of hosts as a group or multicast transmission. Unicast transmissions use unicast addresses to send packets to single destinations associated with the unicast addresses. Broadcast transmissions use broadcast addresses to send packets to entire network segments or subnetworks. Multicast transmissions use multicast addresses to send packets to subsets of hosts configured as members of respective multicast groups. The members of a multicast group can reside on a same network or different networks.

IP multicast can conserve bandwidth by reducing traffic through simultaneous delivery of a stream of information to numerous recipients. Typically, multicast packets are replicated at a point where paths diverge using multicast protocols such as Protocol Independent Multicast (PIM), thereby delivering source traffic to multiple receivers without burdening the source or receivers and while utilizing a limited amount of network resources. Not surprisingly, IP multicast has gained considerable popularity as demand for multicast traffic continues to grow. For example, IP multicast is increasingly implemented in a wide variety of applications such as, for example, video conferencing, enterprise communications, and distribution of software and information.

At the same time, IP multicast can be significantly complex to implement and despite its numerous benefits, current IP multicast solutions face difficult challenges that can negatively impact the cost, performance and stability of multicast deployments. For example, in multicast deployments, multicast-capable routing devices use a multicast routing protocol to build a distribution tree for each multicast group. The distribution tree represents the multicast path(s) or state and allows sources to send packets to receivers. The distribution tree is updated periodically as nodes join or leave the multicast group or the topology changes. Moreover, a single point of failure can affect the distribution tree, requiring the network to reconstruct or repair the distribution tree. However, the process of updating or reconstructing the distribution tree can take time, which can cause disruption in multicast services and communications until the process completes and the network converges. The process also involves a significant amount of network communications, often including duplicate traffic. This traffic can significantly burden the network, thereby increasing cost and reducing network and service performance.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1:
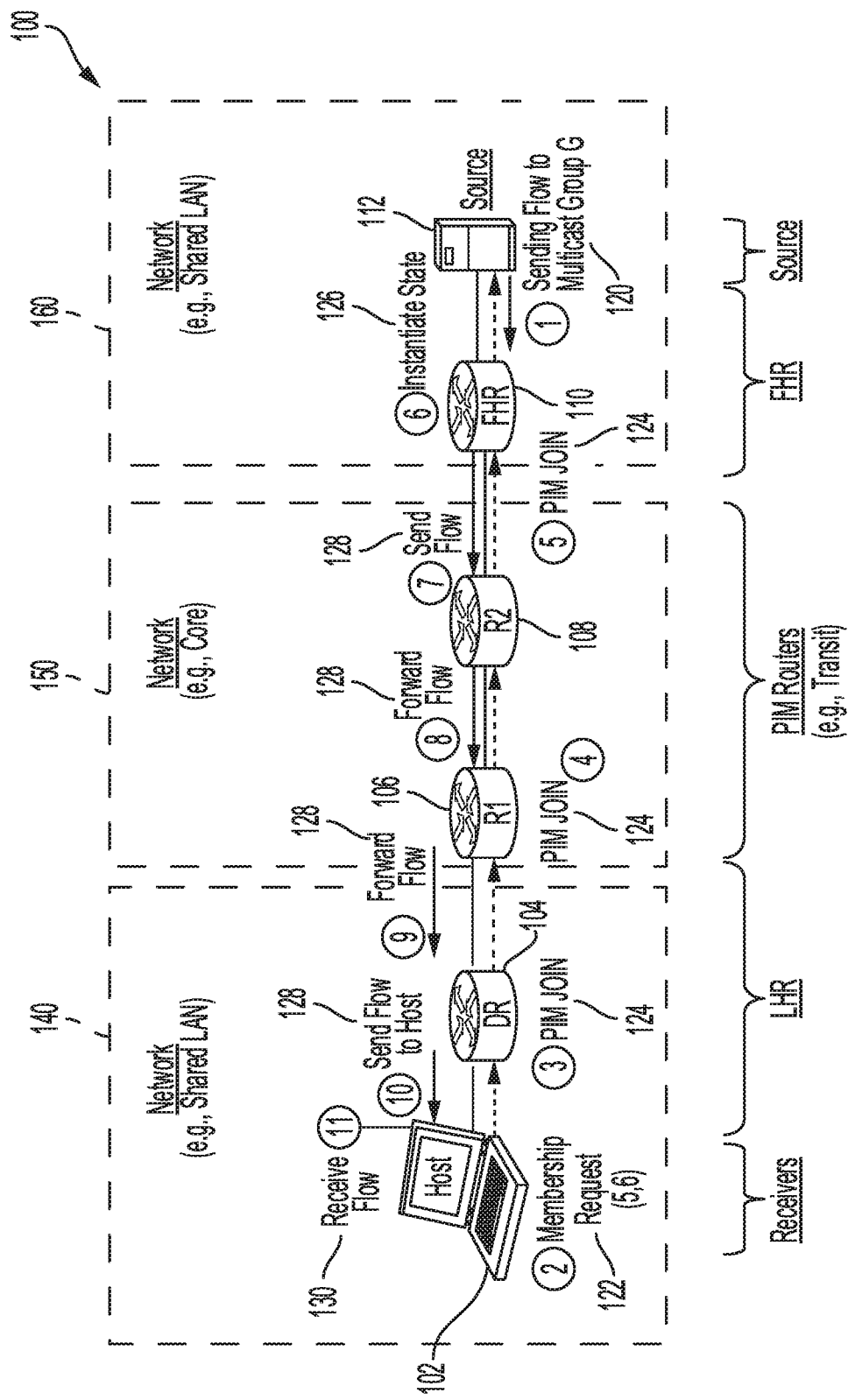
FIG. 1 illustrates an example model for PIM services, in accordance with some examples.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

OVERVIEW

Disclosed are systems, methods, and computer-readable media for implementing redundant multicast trees with fast recovery and without (or with limited) duplication. In some examples, a method is provided for implementing redundant multicast trees with fast recovery and without (or with limited) duplication. In some examples, the method can include receiving, by a protocol independent multicast (PIM) backup designated router (BDR), a request from a host device to join a multicast group associated with a source of multicast traffic. The host device can be a receiver requesting membership in the multicast group (e.g., multicast group G) associated with the source (e.g., source S) of multicast traffic. The request from the host device can be a message expressing interest in receiving traffic destined for the multicast group (e.g., G) from the source (e.g., S). The host device can send the request to the PIM BDR using any communications protocol suitable for establishing multicast group memberships, such as Internet Group Management Protocol (IGMP) for example.

The PIM BDR can be configured as a backup designated router (DR) for redundancy. A DR is a PIM-capable router that can act on behalf of host(s) connected to the DR (e.g., via a shared local area network or LAN) with respect to PIM operations and signaling. A DR can be elected through an election process for an interface (e.g., a LAN or otherwise) to serve as a DR for members or receivers on that interface or network. As previously mentioned, the PIM BDR can be configured as a backup DR to run on standby mode (and/or non-forwarding mode) while another DR is active, and switch to active mode (and/or forwarding mode) if there is a failure or problem (e.g., an access link failure, a core link failure, a PIM router failure, etc.) that can be fixed or addressed by migrating the active DR role to the BDR.

The method can further include sending, by the PIM BDR in response to the request, a PIM join message to a next hop (e.g., the next hop PIM-capable router) between the PIM BDR and the source of the multicast traffic. For example, the PIM BDR can send a PIM join message towards the source of multicast traffic and/or a merge point in the path (e.g., a first hop router (FHR) connected to the source, a rendezvous point (RP) router configured as a root of a multicast tree for the multicast group, a PIM router located at a merge point between paths and or backup and active multicast trees for the multicast group, etc.).

The PIM join message can include attributes (e.g., join attributes) identifying an address of the PIM BDR (e.g., the loopback address of the PIM BDR) and indicating, that the PIM join message is a backup PIM join from a backup DR. As further explained below, the address of the PIM BDR can be included in the PIM join message to inform a merge point router (e.g., RP router, FHR router, etc.) along the path of the PIM join message of an address that can be used to communicate with the PIM BDR through unicast communications (e.g., direct or point-to-point communications) to avoid duplicate PIM-related traffic when running the PIM BDR, performing a DR migration, reconstructing or updating a multicast tree, etc. For example, a merge point router, such as an RP or FHR router, that receives the PIM join message can extract and/or store the address in the attributes of the PIM join message and use the address for unicast communications with the PIM BDR for a DR migration event.

Moreover, the attribute identifying the PIM join message as a backup PIM join can be used to inform a receiving merge point router that the PIM join is for a backup multicast tree and/or path, and thus should be set to blocking or non-forwarding mode while an active DR and multicast tree are in use. The attribute in the PIM join message can also inform the receiving merge point router that the originator of the PIM join message (e.g., the PIM BDR) is a backup DR and is thus not active (e.g., is in standby). The receiving merge point router can use the PIM join message to build a backup multicast tree state for the multicast group and source, and can use the attributes identifying the PIM join message as a backup PIM join and the PIM BDR as a backup DR to know that the backup multicast tree state (and/or the outgoing interface (OIF) associated with the backup PIM join) should be set to blocking or non-forwarding state to avoid conflicts or problems with an active multicast tree state for the multicast group and/or any PIM router that does not understand the attribute identifying the PIM join as a backup join or does not know how to handle such PIM join messages.

Each PIM router that receives the PIM join message along the way to a merge point router can process the PIM join message by checking if it already has active state for the multicast group (S, G)) and, when no active state is found, instantiating multicast state or a multicast entry for the multicast group (e.g., (S, G)), storing the address of the PIM BDR in the attributes of the PIM join message, and sending the PIM join message to the next hop. In some cases, when sending the PIM join message to the next hop, a PIM router can also include its own address as an attribute of the PIM join message to inform other PIM routers along the path of its own address and/or provide insight on the route taken by the PIM join message. Each hop can process the PIM join message similarly and send it along to the next hop.

As further explained below, when the PIM join message reaches a merge point router such as an RP or FHR router, the merge point router can determine that an active join state is already present, set the OIF of the backup PIM join to blocking or non-forwarding state, and use the address of the PIM BDR included in the PIM join message to send to the PIM BDR a unicast message. The unicast message to the PIM BDR can include, as part of the unicast message (e.g., in the header), an address of the merge point router, which the PIM BDR, can use to send unicast messages (e.g., PIM-related unicast communications) to the merge point router, thereby using point-to-point signaling instead of hop-by-hop signaling and thus reducing or eliminating duplicate traffic.

For example, after the PIM join message has been received and processed by a merge point router, the method can include receiving, by the PIM BDR, from a PIM router located along a path between the PIM BDR and the source of the multicast traffic (e.g., a merge point router such as an RP or FHR router), a first unicast message sent to the address of the PIM BDR identified in the PIM join message. The first unicast message can identify or include (e.g., in the header) an address of the PIM router, which the PIM BDR can obtain to use to send unicast messages to the PIM router. In some cases, the method can include storing, by the PIM BDR, the address associated with the PIM router and a route associated with the first unicast message. The route can be identified based on information in the first unicast message (e.g., hops or path traversed), for example.

In some cases, multiple PIM BDRs can send such PIM join messages. The PIM join messages from the different PIM BDRs can have different BDR values associated with the different PIM BDRs and/or PIM join messages. When a PIM router receives backup PIM joins from different PIM routers for a multicast group (e.g., (S, G)), the PIM router can obtain the different BDR values from the backup PIM joins. The PIM router can then send a backup PIM join upstream containing the BDR values (e.g., a list of BDR addresses). After receiving the backup PIM join, the merge point router can use the listed BDR addresses to send a unicast message to each of the listed BDR addresses.

The method can further include changing, in response to a DR migration triggering event, a first instance of a backup multicast tree state at the PIM BDR from blocking to forwarding. The first instance of the backup multicast tree state can be the backup multicast tree state stored at the PIM BDR for the multicast group and source. The backup multicast tree state can thus be backup multicast state associated with the source of the multicast traffic and the multicast group (e.g., (S, G) state). Moreover, the backup multicast tree state can include a backup multicast distribution tree for the multicast group and source.

The DR migration triggering event can be any condition, activity or event configured to trigger the migration of the DR role and/or active multicast tree state from an active PIM DR to a backup or standby PIM DR (e.g., PIM BDR). For example, the DR migration triggering event can be an access interface failure (e.g., an access interface going down), a core link failure, a failure experienced by one or more PIM routers (e.g., one or more PIM routers going down), and/or any other event or condition that may interfere with or cause errors or disruption with multicast routing and communications using a currently-active path and/or PIM DR. The DR migration triggering event can thus trigger migration of DR roles and multicast tree states (e.g., from an active to a backup multicast tree state and vice versa).

The method can also include sending, by the PIM BDR to the PIM router, a second unicast message including an instruction to change a second instance of the backup multicast tree state at the PIM router from blocking to forwarding. The second instance of the backup multicast tree state can be the backup multicast tree state stored at the PIM router for the multicast group and source (e.g., (S, G) state). The second instance of the backup multicast tree state can include the backup multicast distribution tree for the multicast group and source.

In some cases, changing the first instance of the backup multicast tree state from blocking to forwarding and sending the second unicast message can include migrating the PIM BDR to a PIM designated router (DR) (e.g., changing a role of the PIM BDR from backup DR to active PIM DR) and changing the backup multicast tree state from backup or blocking to active or forwarding. Moreover, in some cases, upon migrating from backup DR to active DR, the PIM BDR (now the active PIM DR) can send to the next hop between the PIM BDR and the source of the multicast traffic one or more PIM join messages at one or more intervals. The PIM join messages can be active PIM joins since the PIM BDR is now the active DR. For example, the active PIM DR (e.g., the PIM BDR after migration) can send periodic PIM join messages upstream. The active joins will begin propagating to other PIM routers, though in many cases such PIM joins may not make any multicast state changes along the way as the complete multicast tree was already constructed in the previous steps.

In some aspects, a system for implementing redundant multicast trees with fast recovery and without (or with limited) duplication is provided. An example system can include a PIM BDR including one or more processors and at least one computer-readable storage medium having stored therein instructions which, when executed by the one or more processors, cause the PIM BDR to receive a request from a host device to join a multicast group associated with a source of multicast traffic; in response to the request, send a PIM join message to a next hop between the PIM BDR and the source of the multicast traffic, the PIM join message including attributes identifying an address of the PIM BDR and indicating that the PIM join message is a backup PIM join from a backup DR; receive, from a PIM router located along a path between the PIM BDR and the source of the multicast traffic, a first unicast message sent to the address identified in the PIM join message, the first unicast message identifying an address associated with the PIM router; store the address associated with the PIM router and a route associated with the first unicast message; change, in response to a DR migration triggering event, a first instance of a backup multicast tree state at the PIM BDR from blocking to forwarding, the backup multicast tree state being associated with the source of the multicast traffic and the multicast group; and send, to the PIM router, a second unicast message including an instruction to change a second instance of the backup multicast tree state at the PIM router from blocking to forwarding.

The PIM router can be a merge point router, such as an RP router, an FHR router, or a PIM router located at a fork between an active path or multicast tree and a backup path or multicast tree associated with the multicast group and source. The PIM router can be downstream from the source of the multicast traffic and upstream from the PIM BDR. Moreover, each PIM-capable router that receives the PIM join message from the PIM BDR along the way to a merge point router (e.g., the PIM router) can process the PIM join message by checking if it already has active state for the multicast group (e.g., (S, G)) and, when no active state is found, instantiating multicast state or a multicast entry for the multicast group (e.g., (S, G)), storing the address of the PIM BDR the attributes of the PIM join message, and sending the PIM join message to the next hop. In some cases, when sending the PIM join message to the next hop, the sending PIM router can also include its own address as an attribute of the PIM join message to inform other PIM routers along the path of its own address and/or provide insight on the route taken by the PIM join message. Each hop can process the PIM join message similarly and send it along to the next hop.

As further explained, when the PIM join message reaches a merge point router (e.g., the PIM router), the merge point router can determine that an active join state is already present, set the OIF of the backup PIM join to blocking or non-forwarding state, and use the address of the PIM BDR in the RIM join message (e.g., in the header) to send to the PIM BDR a unicast message. The unicast message to the PIM BDR can include an address of the merge point router, which the PIM BDR can use to send unicast messages (e.g., PIM-related unicast communications) to the merge point router, thereby using point-to-point signaling instead of hop-by-hop signaling and thus reducing, or eliminating duplicate traffic. The address of the merge point router can be included as part of the unicast message (e.g., in the header).

In some cases, changing the first instance of the backup multicast tree state from blocking to forwarding and sending the second unicast message can include migrating the PIM BDR to a PIM designated router (DR) (e.g., changing a role of the PIM BDR from backup DR to active PIM DR) and changing the backup multicast tree state from backup or blocking to active or forwarding. Moreover, in some cases, upon migrating from backup DR to active DR the PIM BDR (now the active PIM DR) can send to the next hop between the RIM BDR and the source of the multicast traffic one or more PIM join messages at one or more intervals. The PIM join messages can be active PIM joins since the PIM BDR is now the active DR. For example, the active PIM DR (e.g., the RIM BDR after migration) can send periodic PIM join messages upstream. The active joins can propagate to other PIM routers, though in many cases such PIM joins may not make any multicast state changes along the way as the complete multicast tree was already constructed in the previous steps.

In some aspects, a non-transitory computer-readable storage medium for implementing redundant multicast trees with fast recovery and without for with limited) duplication is provided. An example non-transitory computer-readable storage medium can include instructions stored therein which, when executed by one or more processors, cause the one or more processors to receive, at a PIM BDR, a request from a host device to join a multicast group associated with a source of multicast traffic; in response to the request, send, by the PIM BDR, a PIM join message to a next hop between the PIM BDR and the source of the multicast traffic, the PIM join message including attributes identifying an address of the PIM BDR and indicating that the PIM join message is a backup PIM join from a backup DR; receive, by the PIM BDR, from a PIM router located along a path between the PIM BDR and the source of the multicast traffic, a first unicast message sent to the address identified in the PIM join message, the first unicast message identifying an address associated with the PIM router; store, by the PIM BDR, the address associated with the PIM router and a route associated with the first unicast message; change, in response to a DR migration triggering event, a first instance of a backup multicast tree state at the PIM BDR from blocking to forwarding, the backup multicast tree state being associated with the source of the multicast traffic and the multicast group; and send, by the PIM BDR to the PIM router, a second unicast message including an instruction to change a second instance of the backup multicast tree state at the PIM router from blocking to forwarding.

The PIM router can be a merge point router, such as an RP router, an FHR router, or a PIM router located at a fork between an active path or multicast tree and a backup path or multicast tree associated with the multicast group and source. Moreover, the PIM router can be downstream from the source of the multicast traffic and upstream from the PIM BDR. Further, each PIM-capable, router that receives the PIM join message from the PIM BDR along the way to a merge point router (e.g., the PIM router) can process the PIM join message by checking if it already has active state for the multicast group (e.g., (S, G)) and, when no active state is found, instantiating multicast state or a multicast entry for the multicast group (e.g., (S, G)), storing the address of the PIM BDR in the attributes of the PIM join message, and sending the PIM join message to the next hop. In some cases, when sending the PIM join message to the next hop, the sending PIM router can also include its own address as an attribute of the PIM join message to inform other PIM routers along the path of its own address and/or provide insight on the route taken by the PIM join message. Each hop can process the PIM join message similarly and send it along to the next hop.

As further explained, when the PIM join message reaches a merge point router (e.g., the PIM router), the merge point router can determine that an active join state is already present, set the OIF of the backup PIM join to blocking or non-forwarding state, and use the address of the PIM BDR included in the PIM join message to send to the PIM BDR a unicast message. The unicast message to the PIM BDR can include an address of the merge point router, which the PIM BDR can use to send unicast messages (e.g., PIM-related unicast communications) to the merge point router, thereby using point-to-point signaling instead of hop-by-hop signaling and thus reducing or eliminating duplicate traffic. The address of the merge point router can be included as part of the unicast message (e.g., in the header).

In some cases, changing the first instance of the backup multicast tree state from blocking to forwarding and sending the second unicast message can include migrating the PIM BDR to a PIM designated router (DR) (e.g., changing a role of the PIM BDR from backup DR to active PIM DR) and changing the backup multicast tree state from backup or blocking to active or forwarding. Moreover, in some cases, upon migrating from backup DR to active DR, the PIM BDR (now the active PIM DR) can send to the next hop between the PIM BDR and the source of the multicast traffic one or more PIM join messages at one or more intervals. The PIM join messages can be active PIM joins since the PIM BDR is now the active DR. For example, the active PIM DR (e.g., the PIM BDR after migration) can send periodic PIM join messages upstream. The active joins can propagate to other PIM routers, though in many cases such PIM joins may not make any multicast state changes along the way as the complete multicast tree was already constructed in the previous steps.

In some aspects, the system, method, and non-transitory computer-readable medium described above can include receiving the PIM join message from the PIM BDR at the PIM router, which in this example can be a merge point; determining that the PIM router has previously received an active PIM join associated with the multicast group and has an active multicast tree state (which can include the active multicast tree) associated with the multicast group, the active PIM join being from an active PIM DR (as opposed to the PIM BDR, prior to migration); setting the second instance of the backup multicast tree state (which can include the backup multicast tree) at the PIM router to a blocking state; and sending, by the PIM router, the first unicast message to the address identified in the PIM join message from the PIM BDR (e.g., the address of the PIM BDR), the first unicast message indicating that the PIM router is the merge point between the active multicast tree and the backup multicast tree.

In some aspects, the system, method, and non-transitory computer-readable medium described above can include receiving, by a different PIM router, an active PIM join associated with a second host device and the multicast group, where the different PIM router is a new merge point for the backup multicast tree and the active multicast tree and is located along a path between the source of the multicast traffic and both the second host device and the PIM BDR (e.g., a different network, such as a different LAN, than the PIM BDR, the PIM router, and the active PIM DR); determining that the different PIM router has previously received the backup PIM join and has a third instance of the backup multicast tree state associated with the multicast group; setting the third instance of the backup multicast tree state to a blocking state; sending, by the different PIM router, a third unicast message to the address identified in the PIM join message from the PIM BDR (e.g., the address of the PIM BDR), the third unicast message indicating that the different PIM router is the new merge point for the active multicast tree and the backup multicast tree; and sending, by the different PIM router, a copy of the active PIM join to the PIM router, the copy of the active PIM join identifying an address associated with the different PIM router and identifying the different PIM router as the new merge point. This case may arise when a new active join is received on the backup path before the merge point (e.g., the PIM router described above).

Moreover, in response to receiving the PIM join message sent by the PIM BDR, the PIM router can store the second instance of the backup multicast tree state and a unicast address (e.g., the address of the PIM BDR) associated with a designated destination (e.g., the PIM BDR) for unicast communications relating to the backup multicast tree and/or the active multicast tree. In response to receiving the active RIM join, the PIM router can also update the unicast address to the address of the different PIM router and update the second instance of the backup multicast tree state at the PIM router based on the active PIM join.

In some aspects, the system, method, and non-transitory computer-readable medium described above can include receiving, by the next hop, the PIM join message from the PIM BDR; in response to receiving the PIM join message, determining that the next hop does not have multicast tree state associated with the multicast group and the source of the multicast traffic; instantiating the multicast tree state at the next hop; storing, by the next hop, the address associated with the PIM BDR as a unicast address for communicating with the PIM BDR; and sending, by the next hop, a copy of the PIM join message towards the PIM router, the copy of the PIM join message identifying the address associated with the PIM BDR.

EXAMPLE EMBODIMENTS

Figure 9:
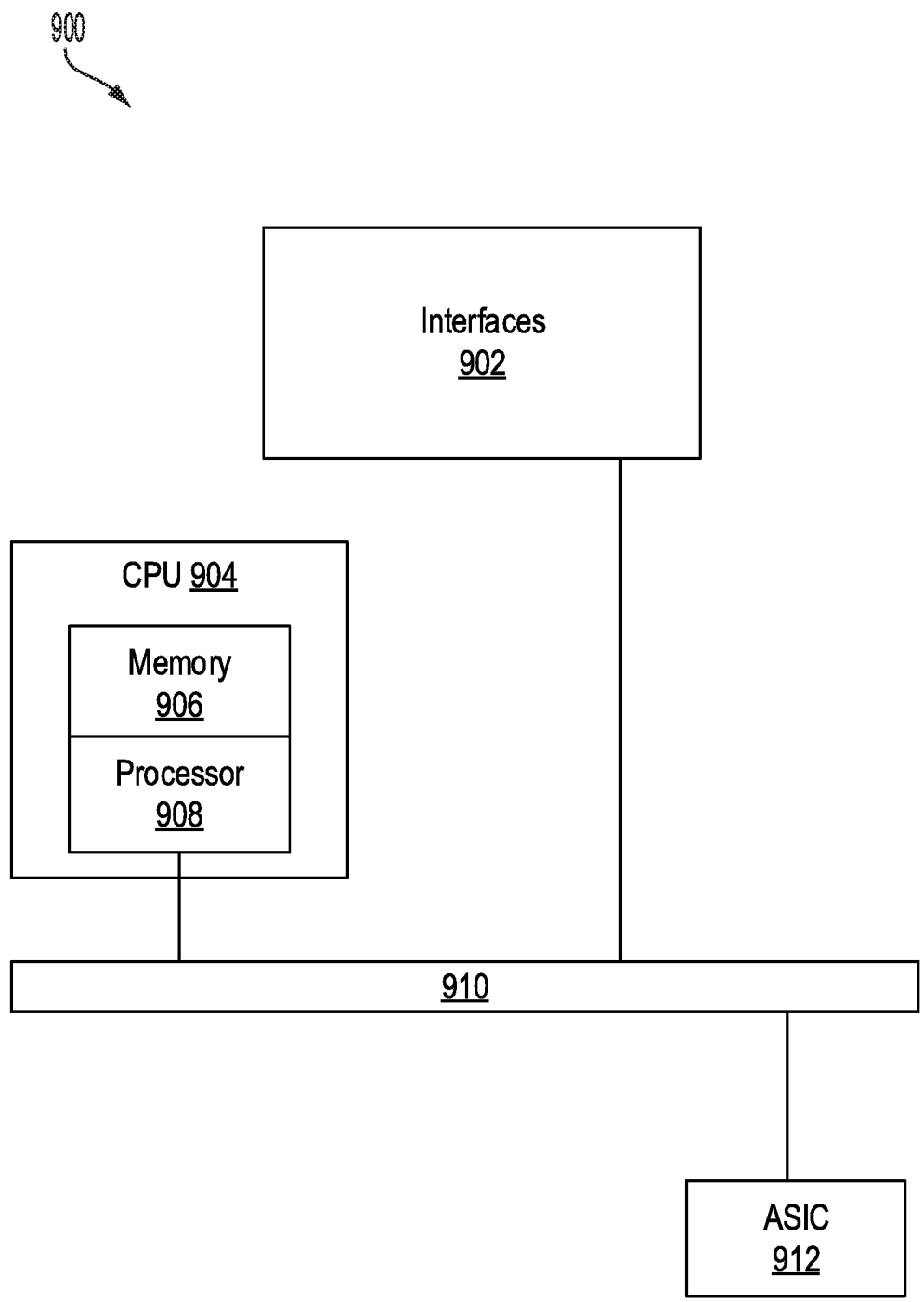
FIG. 9 illustrates an example network device in accordance with some examples.
Figure 10:
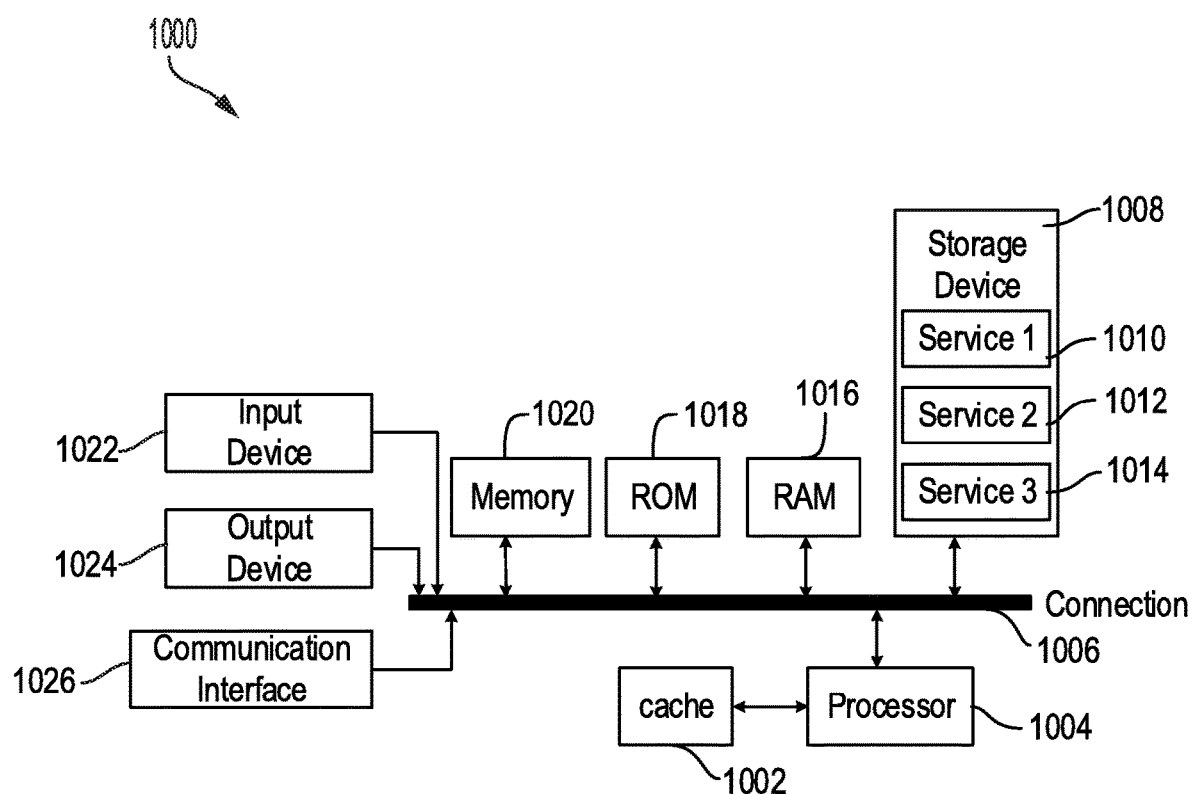
FIG. 10 illustrates an example computing device architecture in accordance with some examples.

Disclosed are systems, methods, and computer-readable media for implementing redundant multicast trees with fast recovery and without (or with limited) duplication of traffic. The present technologies will be described in more detail in the following disclosure as follows. The discussion begins with a description of example models and architecture for protocol independent multicast (PIM) services, as illustrated in FIGS. 1 through 2C. A description of example methods and processes for implementing redundant multicast trees with faster recovery and without (or with limited) duplication of traffic, as illustrated in FIGS. 3A through 8 will then follow. The discussion concludes with a description of an example network device, as illustrated in FIG. 9, and an example computing device architecture, as illustrated in FIG. 10, including example hardware components suitable for performing networking and computing operations.

The disclosure now turns to FIG. 1, which illustrates an example model 100 for PIM services. The example model 100 includes a source 112 of multicast traffic. The source 112 can be any computing device or node such as, for example, a server, a virtual machine (VM), a software container, a laptop computer, a smartphone, a tablet computer, a switch, a desktop computer, a network device, etc. The source 112 is illustrated sending (120) a data flow to a multicast group G including various devices or receivers that are members of the multicast group G.

If a device or node that is not a member of the multicast group G wants to receive traffic from the source 112 to the multicast group G, the device or node can issue a membership request expressing interest in joining the multicast group G to receive such traffic from the source 112 to the multicast group G. For example, host 102, which in this example is not currently a member of the multicast group G, can issue a membership request 122 expressing an interest in receiving traffic from the source 112 to the multicast group G. Host 102 can be any computing device or node such as, for example, a laptop computer, a smartphone, a tablet computer, a gaming system, a smart television, a server, a VM, a software container, a network device, etc.

The host 102 can send the membership request 122 using any communications protocol or mechanism suitable for establishing multicast group memberships, such as Internet Group Management Protocol (IGMP), multicast listener discovery (MLD) protocol, etc. Moreover, the host 102 can send the membership request 122 to a PIM designated router (DR) 104 connected to the host 102 via a network 140 and/or to all PIM routers on the network 140. The network 140 can be, for example, a private or local network such as a local area network (LAN). The PIM DR 104 can be a local PIM-capable router running as, or elected as, a designated router for receivers on the network 140. The PIM DR 104 is also the last hop router (LHR) for PIM traffic and operations associated with the host 102. As a DR router, PIM DR 104 can act on behalf of hosts connected to the DR (e.g., via a shared LAN) with respect to PIM operations and signaling. Thus, in this example, PIM DR 104 can act on behalf of host 102, which is connected to PIM DR 104 via network 140, with respect to operations and signaling (e.g., PIM joins, PIM prunes, etc.).

For example, after receiving the membership request 122, PIM DR 104 can send a PIM join message 124 towards the source 112 of the multicast traffic to multicast group G. The PIM join message 124 in this example can be described as an (S, G) join (where S represents the source 112 and G represents the multicast group G) because it joins multicast group G for source S (112) to that group. The (S, G) join travels hop-by-hop towards a merge point or rendezvous point (RP) for the multicast group G, and each PIM-capable router that receives the (S, G) join instantiates a multicast tree state for the multicast group G. Eventually, the (S, G) join reaches the merge point or RP that already has (S, G) join state for the multicast group G, and where join messages from various receivers converge and form a multicast distribution tree for multicast group G that is rooted at the merge point or RP.

To illustrate, after receiving the membership request 122, PIM DR 104 can send a PIM join message 124 to the next hop along the path to the source 112, which in this example is PIM router 106 on network 150. Network 150 can include a private and/or public network, such as a LAN, a wide area network (WAN), etc. For example, network 150 can be a core network or service provider network. PIM router 106 can receive the PIM join message 124, instantiate a multicast tree state for the multicast group G, and forward the PIM join message 124 to the next hop along the path to the source 112, which in this example is PIM router 108. PIM router 108 can receive the PIM join message 124 and similarly instantiate a multicast tree state for the multicast group G and forward the PIM join message 124 to the next hop along the path to the source 112, which in this example is first hop router (FHR) 110.

FHR 110 can be a PIM-capable router connected to the source 112. FHR 110 can be connected to the source 112 via network 160, which can include a private or local network such as a LAN. Moreover, the FHR 110 in this example can represent a merge point used as the root of the multicast distribution tree for multicast group G. However, in other examples, one or more other PIM routers (on one or more same or different networks as FHR 110) can be a merge point or RP for multicast group G either in lieu of or in addition to FHR 110.

FHR 110 can receive the PIM join message 124 and instantiate (126) the multicast distribution tree for multicast group G. At this point, host 102 is a member of the multicast group G and can receive traffic from the source 112 destined to the multicast group G. The traffic can be routed to the host 102 using the multicast distribution tree for multicast group G. For example, upon receiving a data flow from source 112 destined to the multicast group G, FHR 110 forward (128) the flow to PIM router 108 based on the multicast distribution tree for multicast group G. PIM router 108 can receive the flow and forward (128) the flow to PIM router 106 using the multicast distribution tree for multicast group G. PIM router 106 can receive the flow and similarly use the multicast distribution tree for multicast group G to forward (128) the flow to the next hop towards the host 102, which in this example is PIM DR 104. PIM DR 104 can then receive the flow and forward (128) the flow to the host 102. In this way, the host 102 can receive the flow and airy future flows from the source 112 destined to the multicast group G until the host 102 leaves the multicast group G.

Figure 2A:
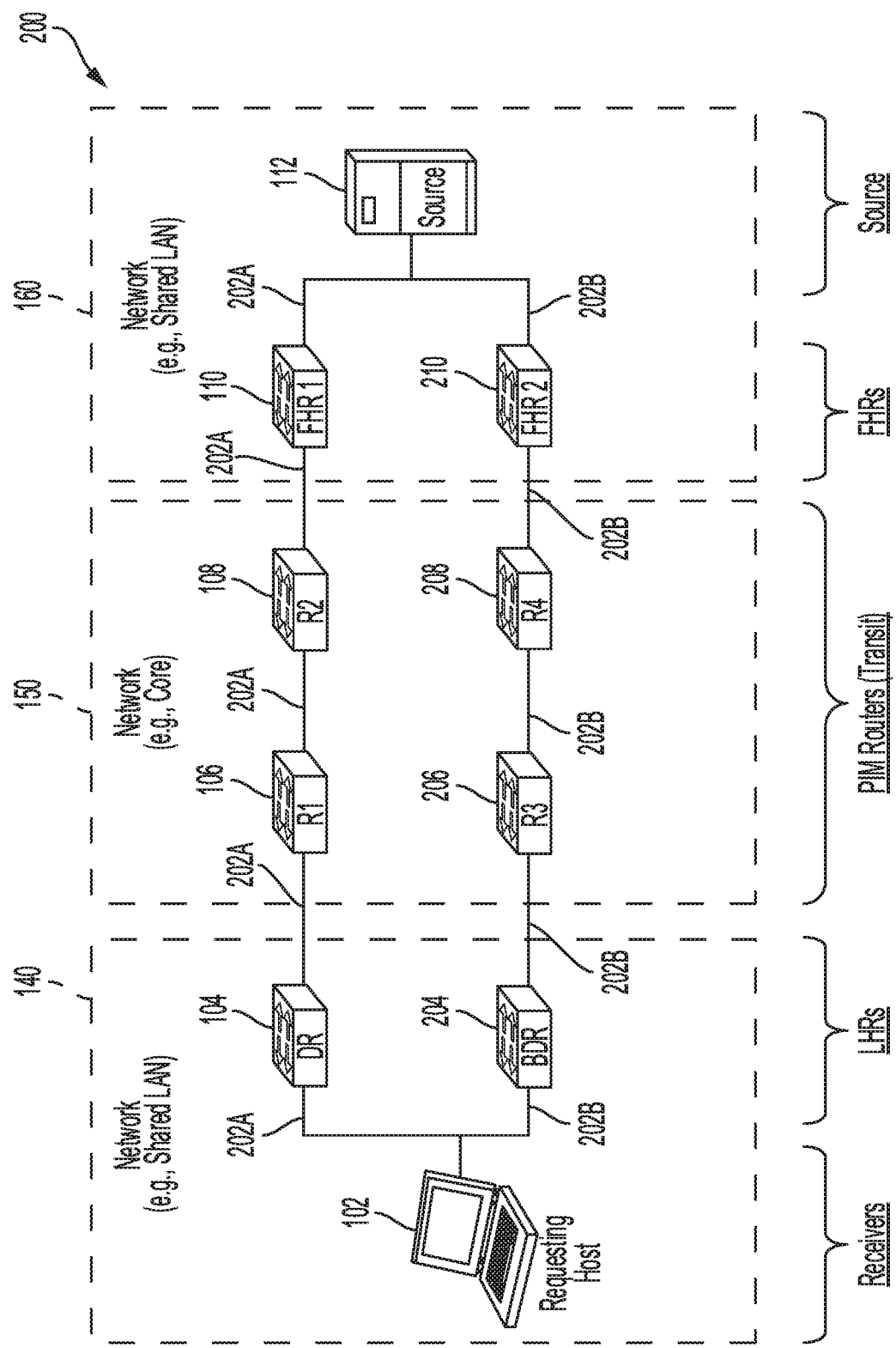
FIG. 2A illustrates an example PIM services deployment with active and backup designated routers in an example topology with disjoint paths, in accordance with some examples.

FIG. 2A illustrates an example PIM services deployment 200 with active and backup designated routers in an example topology with disjoint paths. In this example, the PIM DR 104 operates as an active designated router for host 102 and resides on an active path 202A to the source 112, which is associated with an active multicast distribution tree, and PIM BDR 204 is a backup designated router (BDR) for host 102 residing on a backup path 202B to the source 112. The PIM BDR 204 can be deployed or elected as a backup DR for redundancy and used to establish a backup multicast distribution tree which can become the active multicast distribution tree if a problem or failure occurs with the PIM DR 104, the active multicast distribution tree, or any link or element in the active path 202A. Each PIM router along the backup path 202B, including BDR 204, PIM routers 206 and 208, and FHR 210, can store the backup multicast distribution tree state for potential use to recover from a problem or failure that disrupts multicast traffic or PIM operations over the active path 202A and active PIM DR 104.

For example, if a problem or failure that disrupts multicast traffic or PIM operations over the active path 202A and active PIM DR 104 is encountered, the active DR role can be migrated to the PIM BDR 204 and the backup path 202B can become the active path for multicast communications associated with the multicast group G. As such, the backup multicast distribution tree can be enabled for multicast communications and replace the previously active multicast distribution tree (associated with path 202A) as the new active multicast distribution tree. To establish the backup multicast distribution tree state, the PIM BDR 204 is first set to backup designated router. The PIM BDR 204 then sends a PIM join message towards the source 112. In the join attributes of the PIM join message, the PIM BDR 204 can add its address (e.g., its IP loopback address) to inform each hop what device is the originator of the PIM join message and allow other hops in the backup path 202B to communicate with the PIM BDR 204 using unicast communications (e.g., via the address in the join attributes). The PIM BDR 204 can also add a flag in the PIM join message (e.g., as a join attribute) indicating that the PIM join message is a backup PIM join from a backup designated router. This flag thus informs other hops that the PIM join message is a backup PIM join and the PIM BDR 204 is a backup designated router.

In addition, the PIM BDR 204 sets its backup multicast distribution tree state (e.g., (S, G) state) in blocking or non-forwarding mode. The backup multicast distribution tree state is set to blocking or non-forwarding mode because an active multicast distribution tree is already available and in use, and to prevent triggering of PIM assert messages if there are any PIM routers that do not understand the backup PIM join and start forwarding traffic on the backup multicast distribution tree. Moreover, if the PIM BDR 204 continuously receives traffic on the backup multicast distribution tree for a threshold PIM join interval (e.g., 3 PIM join intervals), the PIM BDR 204 can log such event and/or an indication that a PIM router is present which does not understand the backup PIM join.

When the next hop, PIM router 206, receives the backup PIM join from PIM BDR 204, it checks if it already has active state for the multicast group G (e.g., (S,G) state). Since at this point the PIM router 206 does not have any active state for the multicast group G, it creates an entry (e.g., (S,G) entry) for the multicast group G, stores the originator address included by the PIM BDR 204 in the backup PIM join (e.g., as part of a join attribute), and forwards the backup PIM join to the next hop, which in this example is PIM router 208. In some cases, as previously explained, if the PIM router 206 receives backup PIM joins from different PIM routers for a same multicast group (e.g., (S, G), the PIM router 206 can add the addresses of the PIM BDRs that originated such backup PIM joins (e.g., which can be obtained from BDR values contained in the backup PIM joins), and forward a backup PIM join containing the addresses of the PIM BDRs to the next hop as described herein.

When the backup PIM join reaches the next hop, PIM router 208, the PIM router 208 can similarly check that it does not already have active state for the multicast group G (e.g., (S,G) state), create an entry (e.g., (S,G) entry) for the multicast group G, store the addresses included by the PIM BDR 204 and the PIM router 206 in the backup PIM join (e.g., as part of a join attribute), and forward the backup PIM join to the next hop, which in this example is FHR 210.

When the backup join reaches FHR 210, the 210 can store the addresses of the PIM BDR 204 and the PIM routers 206 and 208 included in the backup PIM join message as join attributes) for use in future unicast communications with any of such routers. In this example topology with disjoint paths and two FHRs (110, 210), the FHR 210 can also act as a merge point since it is a first hop router, and send a unicast message to the address of the PIM BDR 204, which the FHR 210 can obtain from the backup PIM join message. In the unicast message, the FHR 210 can include (e.g., in the header as part of the unicast message) its own address to allow the BDR 204 to obtain the address of the FHR 210 for future unicast communications and PIM signaling, such as designated router and backup multicast distribution tree migrations, to the FHR 210. This can allow the PIM BDR 204 and FHR 210 to use point-to-point signaling for PIM migration operations and communications as opposed to hop-by-hop signaling, thus eliminating or reducing duplicate traffic for such PIM migration operations and communications.

In other cases where the FHR 210 is actually a merge point (for example if FHR 210 was instead a fork point for both the active and backup paths 202A and 202B), when the backup PIM join reaches the FHR 210, the FHR 210 would see an active join state already present and set the outgoing interface (OIF) of the backup PIM join to blocking or non-forwarding mode. The FHR 210 would also send a unicast message to the PIM BDR 204 as previously explained. Moreover, in both scenarios, the FHR 210 can send multiple unicast packets to the PIM BDR 204 to prevent or reduce the likelihood of a packet loss from impacting the process.

When the PIM BDR 204 receives the unicast message from the FHR 210, it stores the address of the FHR 210, which the PIM BDR 204 can obtain from the unicast message, and can also store the route from the FHR 210 to the PIM BDR 204. As previously explained, the address of the FHR 210 can be used by the PIM BDR 204 to send a unicast message to the FHR 210 when there is a migration of the PIM BDR 204 from backup to active designated router. For example, upon detecting a DR migration triggering event such as a link failure or an active PIM DR (e.g., 104) failure, the PIM BDR 204 can migrate or switch to active DR and take over active DR operations. Here, the PIM BDR 204 can make its backup multicast distribution tree state active by updating the backup multicast distribution tree state from blocking to forwarding mode. The PIM BDR 204 can also send a unicast message to the FHR 210 (using the address of the FHR 210 obtained from the unicast message received by the PIM BDR 204 from the FHR 210) instructing the FHR 210 to similarly update the backup multicast distribution tree state from blocking to forwarding. In some cases, the PIM BDR 204 can send such unicast message multiple times in case there is a packet loss. The FHR 210 can then start forwarding multicast traffic using the newly active multicast distribution tree.

This procedure allows such migration and processing to be performed at only 2 nodes (e.g., the PIM BDR 204 and 210) using point-to-point signaling as opposed to hop-by-hop signaling, thus reducing or eliminating duplicate traffic otherwise resulting from hop-by-hop signaling. Such reduction in traffic used to perform such migrations and processing can significantly reduce the burden on, and performance of, the network and reduce the time it takes to complete a designated router migration.

In some cases, when the PIM BDR 204 becomes the active DR, it not only sends a unicast message to the FHR 210 to change the backup multicast distribution tree state from blocking to forwarding, but it also can start sending active PIM joins. Further, in some cases, even though periodic active PIM joins will start propagating from the BDR 204, such PIM joins may not necessarily make changes to the multicast distribution tree state along the path since the complete multicast distribution tree has been previously constructed.

Figure 2B:
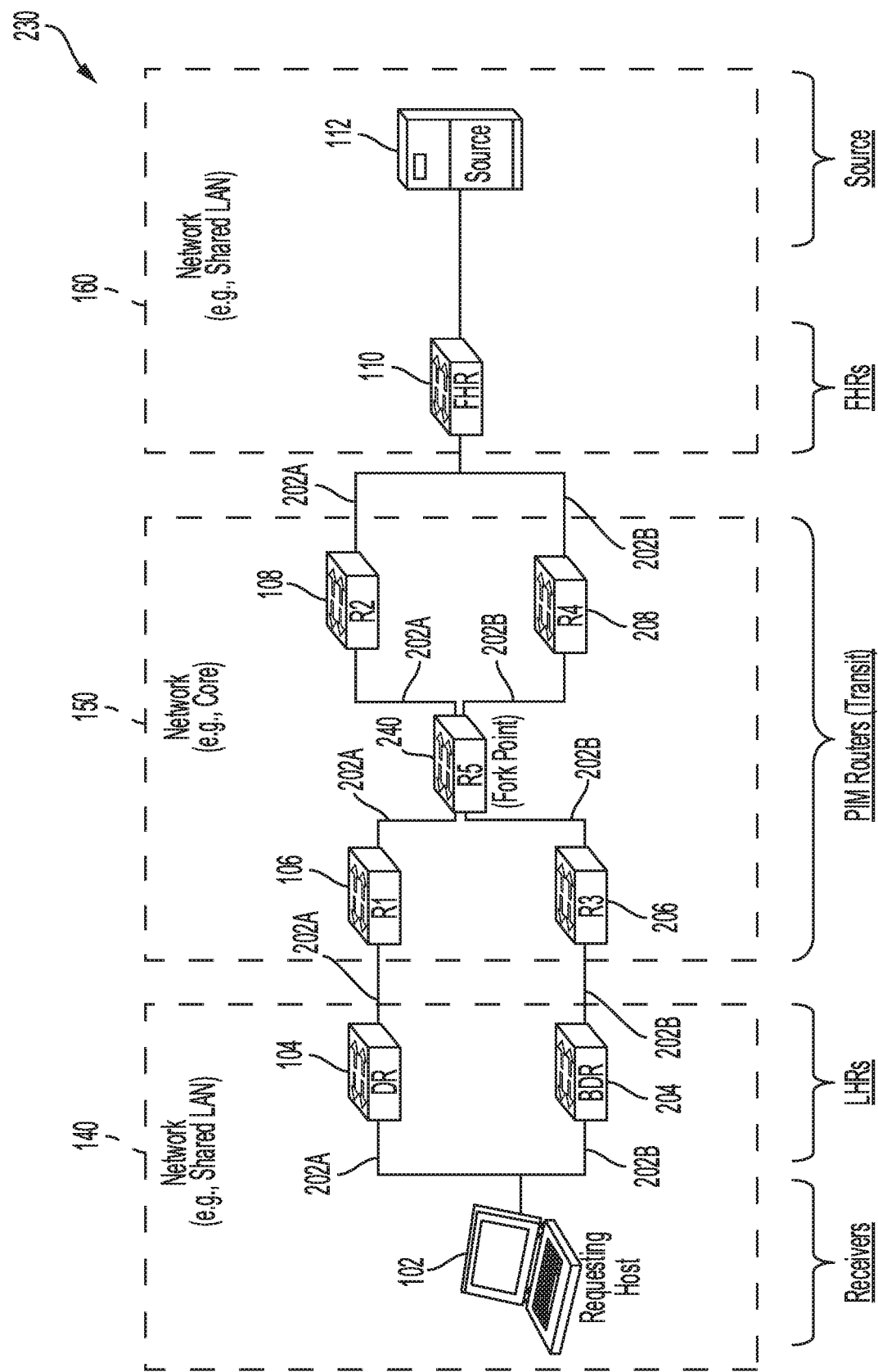
FIG. 2B illustrates an example PIM services deployment with active and backup designated routers in an example topology with a merged path, in accordance with some examples.
Figure 2C:
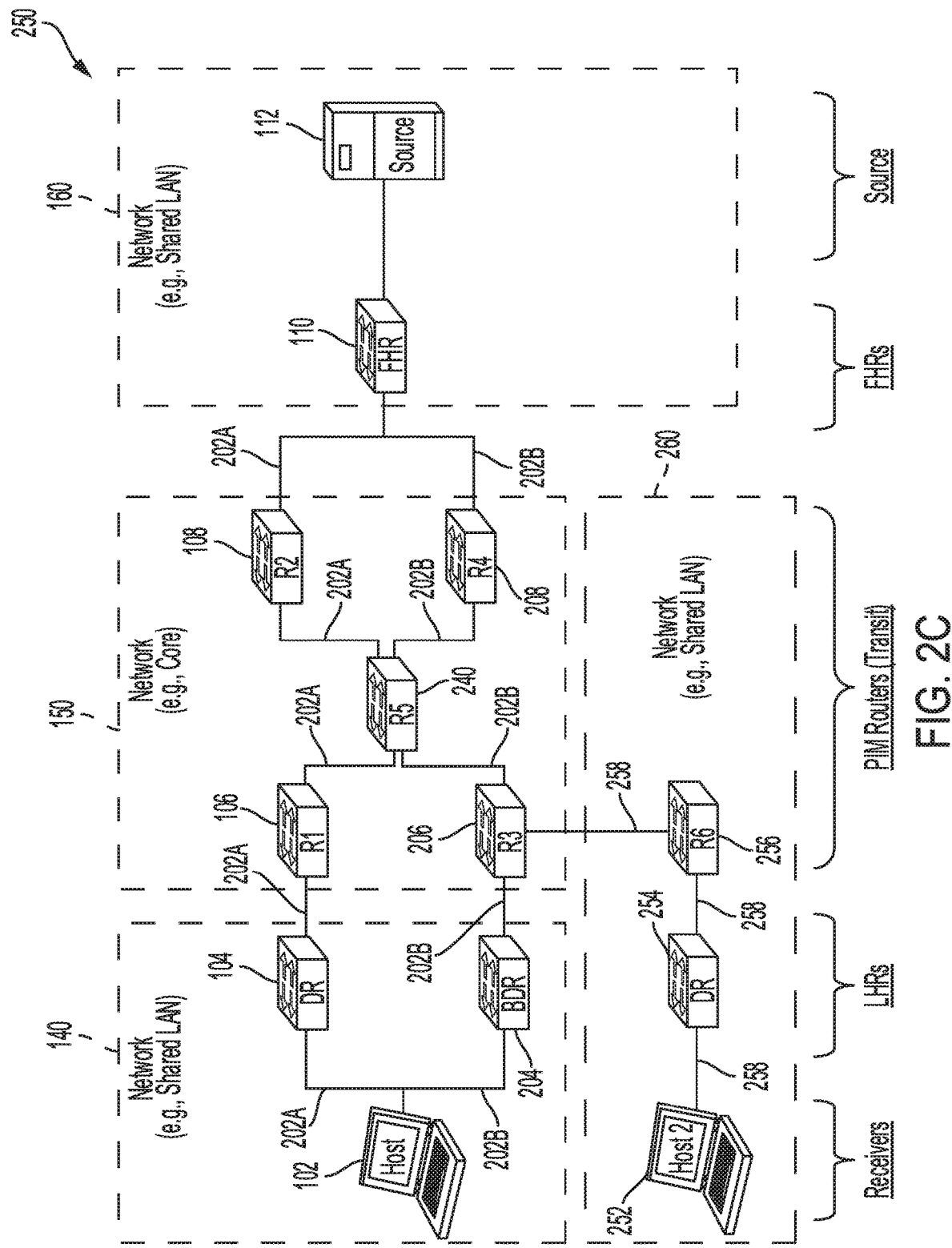
FIG. 2C illustrates an example PIM services deployment with active and backup designated routers in an example topology with a merged path and a different network that overlaps with a current backup multicast distribution tree, in accordance with some examples.

FIG. 2B illustrates an example PIM services deployment 230 with active and backup designated routers in an example topology with a merged path. A topology with a merged path can result when at least one router is part of both the active path 202A to the source 112 and the backup path 202B to the source 112. In this example, PIM router 240 is part of both the active path 202A and the backup path 202B, and thus represents a fork or merge point in a merged path (e.g., a merge point for the backup multicast distribution tree and the active multicast distribution tree).

In the example PIM services deployment 230, when the PIM BDR 204 sends a backup PIM join message towards the source 112, the PIM join message win traverse each hop along the backup path 202B, as previously described with respect to FIG. 2A. However, in (his example, When the backup PIM join message reaches PIM router 240 (e.g., the fork or merge point), PIM router 240 will detect that there is already an active PIM join, which was originated from PIM DR 104 over the active path 202A. Accordingly, the backup PIM join will stop at PIM router 240 rather than continuing to the FHR 110. The PIM router 240 can obtain and store the addresses of the PIM BDR 204 and the PIM router 206, which can be included in the backup PIM join message (e.g., as join attributes), for use in future unicast communications with any of such routers and can set the outgoing interface (OIF) of the backup PIM join to blocking or non-forwarding mode.

The PIM router 240 can then send a unicast message to the address of the PIM BDR 204. The unicast message can include (e.g., in the header as part of the unicast message) an address of the PIM router 240 to allow the PIM BDR 204 to obtain the address of the PIM router 240 for future unicast communications and PIM signaling to PIM router 240, such as designated router and backup multicast distribution tree migrations. The unicast message can also include an indication informing the PIM BDR 204 that the PIM router 240 is a fork or merge point. Upon a failure triggering a designated router migration from PIM DR 104 to PIM BDR 204, the PIM BDR 204 can use the address of the PIM router 240 to send a unicast packet to the PIM router 240 instructing the PIM router 240 to update the backup multicast distribution tree state associated with the PIM BDR 204 and backup path 202B from blocking to forwarding. In this way, the PIM BDR 204 and the PIM router 240 can use point-to-point unicast communications with each other to perform a designated router migration, thereby eliminating or reducing duplicate traffic for such PIM migration operations and communications.

FIG. 2C illustrates an example PIM services deployment 250 with active and backup designated routers in an example topology with a merged path and a different network 260 (e.g., a different LAN) that overlaps with a current backup multicast distribution tree. As illustrated in this example, the different network 260 includes a different path 258 to the source 112, which merges with the backup path 202B. The different path 258 and the backup path 202B here merge at PIM router 206 on the backup path 202B.

The different network 260 includes host 252, PIM DR 254, and PIM router 256. When host 252 wants to join the multicast distribution group associated with the source 112, PIM DR 254 can send an active PIM join towards the source 112. The PIM DR 254 can send the active PIM join over the different path 258, which subsequently can be received and processed by the next hop, the PIM router 256. The PIM router 256 can then forward the active PIM join to the next hop, which in this case is PIM router 206 on the backup path 202B.

In this example, a new active PIM join is received on the backup path 202B before the fork or merge point (e.g., PIM router 240) between the backup path 202B and the active path 202A. In such scenarios, it may not be guaranteed that the active PIM join from the different path 258 will reach the fork or merge point (e.g., PIM router 240) before a backup PIM join transmitted by the BDR 204 over the backup path 202B. For example, in some cases, the PIM router 240 may receive the backup PIM join from PIM BDR 204 before the new active PIM join from PIM DR 254 on the different network 260. In such examples, upon receiving the backup PIM join, the PIM router 240 may process and forward the backup PIM join towards the source 112, and receive the new active PIM join at a later time.

To prevent potential issues resulting from the backup PIM join reaching a fork or merge point before the active PIM join, a mechanism can be implemented to process new active PIM joins received on a backup path (202B) as follows. When the PIM DR 254 originates a new active PIM join for host 252, it can forward the new active PIM join to the next hop, which in this case is PIM router 256 on the different network 260. The PIM router 256 can receive the new active PIM join and create an active multicast distribution tree state based on the new active PIM join. The PIM router 256 can then forward the new active PIM join to the next hop, which in this case is PIM router 206 on the backup path 202B.

When the PIM router 206 receives the new active PIM join, it can determine that it previously received a backup PIM join for the same multicast group and source multicast group (S, G)). In response to determining that a backup RIM join was already received, the PIM router 206 can send a unicast message to the originator of the backup PIM join, which in this example is PIM BDR 204, and forward the new active PIM join to PIM router 240. The PIM router 206 can send the unicast message using an address of the PIM BDR 204 obtained from the backup PIM join message as previously explained. The unicast message to the BDR 204 can inform the PIM BDR 204 that the PIM router 206 is now a fork or merge point for the backup multicast distribution tree.

The PIM BDR 204 can receive the unicast message from the PIM router 206, and update an entry for the multicast group (e.g., (S,G)) to include the address of the PIM router 206 and an indication that the PIM router 206 is a new fork or merge point between the backup path 202B and the different path 258. Each hop after the PIM router 206 can continue using the active multicast distribution tree state as its active state.

The multicast technologies described above with respect to FIGS. 2A-2C can handle various types of failures to reduce or eliminate downtime that may result from such failures and increase the time of convergence. For example, the technologies herein can provide PIM core (e.g., network 150 isolation on the current PIM DR 104. To illustrate, with reference to HG. 2A, if interface or link between PIM DR 104 and PIM router 106 fails or experiences a problem, such failure may not lead to a designated router re-election, as the network 140 (e.g., shared LAN segment) would still be active or functional. A new designated router for the network 140 and/or host 102 would thus be unnecessary and the PIM DR 104 could continue as the designated router for the network 140 and/or host 102.

In some deployments, PIM core isolation may be handled by script, which may cause the access interface or link (e.g., the interface or link between the PIM DR 104 and the host 102) to also go down. However, in such scenarios, a regular designated router re-election procedure can be triggered, and the implementations herein can still provide faster convergence of multicast services than other multicast services implementations. Moreover, when unicast reachability on the active path 202A changes, active PIM joins from PIM DR 104 could instead be originated from the backup path 202B. For example, active PIM joins from PIM DR 104 can be transmitted to the PIM BDR 204 and forwarded by the PIM BDR 204 along the backup path 202B. When the PIM BDR 204 receives the active PIM join associated with the PIM DR 104, it can notify the fork or merge point (e.g., 110 or 240) to start forwarding traffic using the backup multicast distribution tree state. In this scenario, multicast services would still resume quickly.

In another example, the technologies herein can also handle failures experienced in deployments having a ring topology. To illustrate, assume the network 140 (e.g., the shared LAN) has a ring topology. Here, when there is node failure which causes the ring to break, the PIM DR 104 and the PIM BDR 204 can both act as the designated router on the network 140 and start forwarding traffic right away.

In yet another example, when the PIM DR 104 goes down or experiences a failure, the PIM BDR 204 can detect the failure and perform a designated router migration as previously explained. Thus, upon detecting the failure, the PIM BDR 204 can take over right away as the designated router and start forwarding traffic.

The technologies herein can also handle PIM any-source multicast (ASM) and PIM rendezvous point, tree (RPT) switchover. For example, in some implementations, the technologies herein can implement a source discovery mechanism, such as the source discovery mechanism described in Request for Comments (RFC) 8364 (ISSN 2070-1721) by Wijnands et al., entitled "*PIM Flooding Mechanism (PFM) and Source Discovery (SD)*" and dated March 2018, the contents of which are incorporated herein by reference in their entirety. In such examples, the PIM DR 104 and the BDR 204 would both know about the source 112 and can opt to send PIM joins for the multicast group (e.g., (S,G)) directly towards the source 112.

In other implementations, if a source discovery mechanism is not used or available, there may be cases where the PIM DR 104 becomes the shortest-path tree (SPT) after receiving source traffic, where the PIM BDR 204 is still creating the backup multicast distribution tree to the rendezvous point (RP). The RP can be or act as the fork or merge point in this example. In this case, the backup multicast distribution tree would be setup until the RP. When the PIM DR 104 fails, the PIM BDR 204 can start receiving traffic from the shared tree (e.g., the RP Tree) and can later (optionally) move to the SPT. Since a backup path (202B) can be setup (as previously explained) in advance, convergence would still be very fast.

In addition, the technologies herein can provide interoperability with networks where some of the PIM routers do not support the backup designated router implementation or features herein. Thus, the technologies herein can be implemented without backwards compatibility issues even if a network has any PIM routers that do not support some or all of the mechanisms or features herein. For example, if a PIM router in the PIM core (e.g., network 150) does not support or understand the backup multicast distribution tree technologies herein (e.g., the creation and/or use of a backup multicast distribution tree as described herein), the PIM router may treat a backup PIM join as an active PIM join and could potentially start sending traffic towards the PIM BDR 204. However, if the PIM BDR 204 starts receiving, the multicast traffic, it can drop such traffic. In some implementations, the PIM BDR 204 can stop sending backup PIM joins after a period of time. For example, a timer can be used to determine if the backup multicast distribution tree has continuously received traffic over the course of n number of PIM join intervals.

Figure 3A:
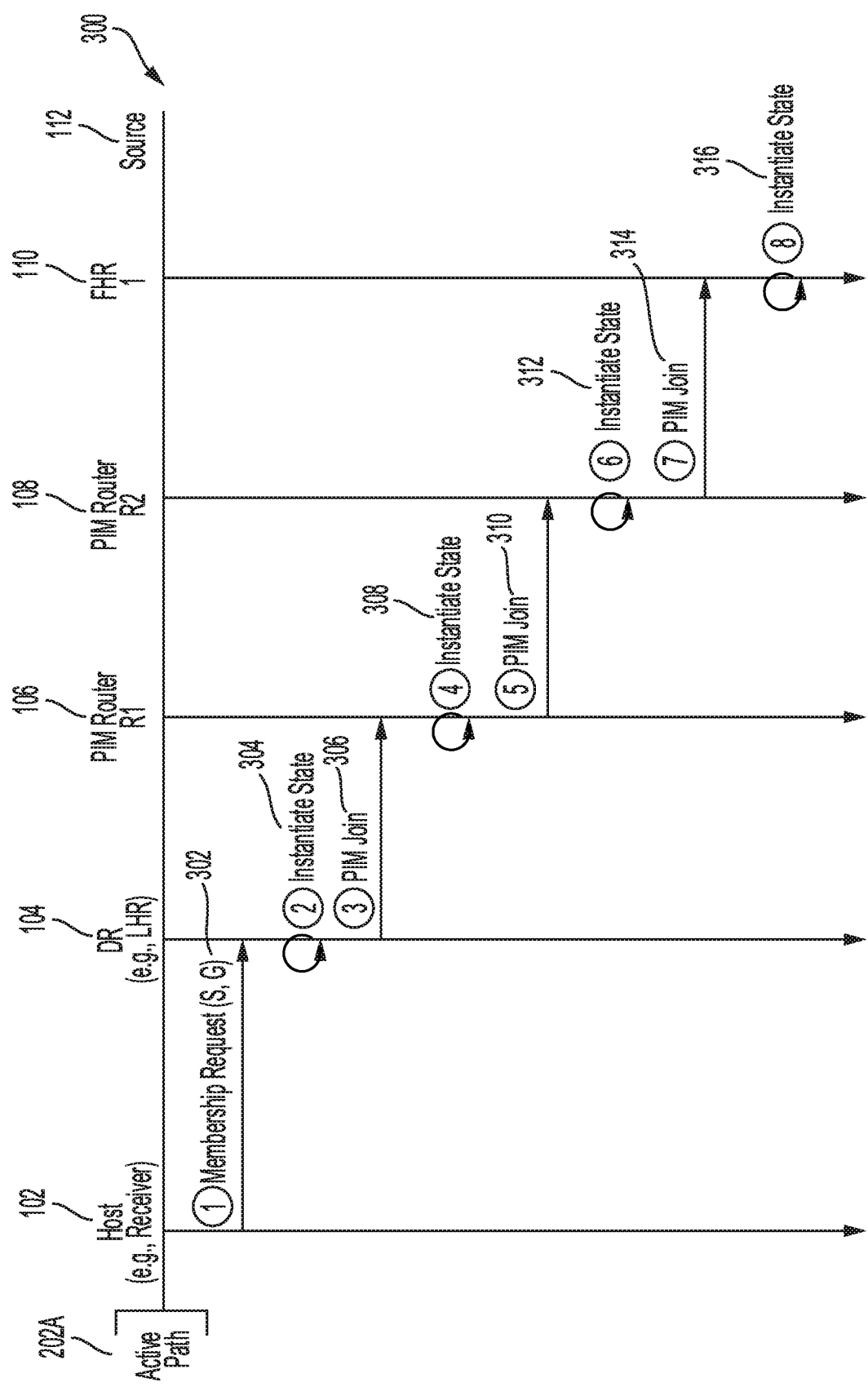
FIG. 3A illustrates an example flow for processing active PIM joins associated with a multicast group and source, in accordance with some examples.

FIG. 3A illustrates an example flow 300 for processing active PIM joins (e.g., active S, G) joins) associated with a multicast group (G) and source 112 (S). For illustrative and explanation purposes, the flow 300 in this example is described with reference to the deployment 200 shown in FIG. 2A.

At step 302, PIM DR 104 receives from the host 102 a multicast group membership (S, G) associated with the multicast group G and source 112. The membership request can be a transmitted by the host 102 using the Internet Group Management Protocol (IGMP) or any other suitable communications protocol. The membership request can indicate that the host 102 is interested in receiving multicast traffic associated with multicast group G from source 112.

At step 304, the PIM DR 104 can instantiate forwarding state and begin forwarding traffic on the network 140 (e.g., the LAN) associated with the host 102 and the PIM DR 104. At step 306, the PIM DR 104 can send an active PIM join to PIM router 106 on the active path 202A.

At step 308, the PIM router 106 can receive the active PIM join and instantiate forwarding state for the active multicast distribution tree associated with the active PIM join. At step 310, the PIM router 106 can forward the active PIM join to the PIM router 108.

At step 312, the PIM router 108 can receive the active PIM join and instantiate forwarding state for the active multicast distribution tree associated with the active PIM join. At step 314, the PIM router 108 can forward the active PIM join to the FHR 110.

At step 316, the FHR 110 can receive the active PIM join and instantiate forwarding state for the active multicast distribution tree associated with the active PIM join. At this point, the full active multicast distribution tree has been created for the active path 202A and multicast traffic can be forwarded using the active multicast distribution tree.

Figure 3B:
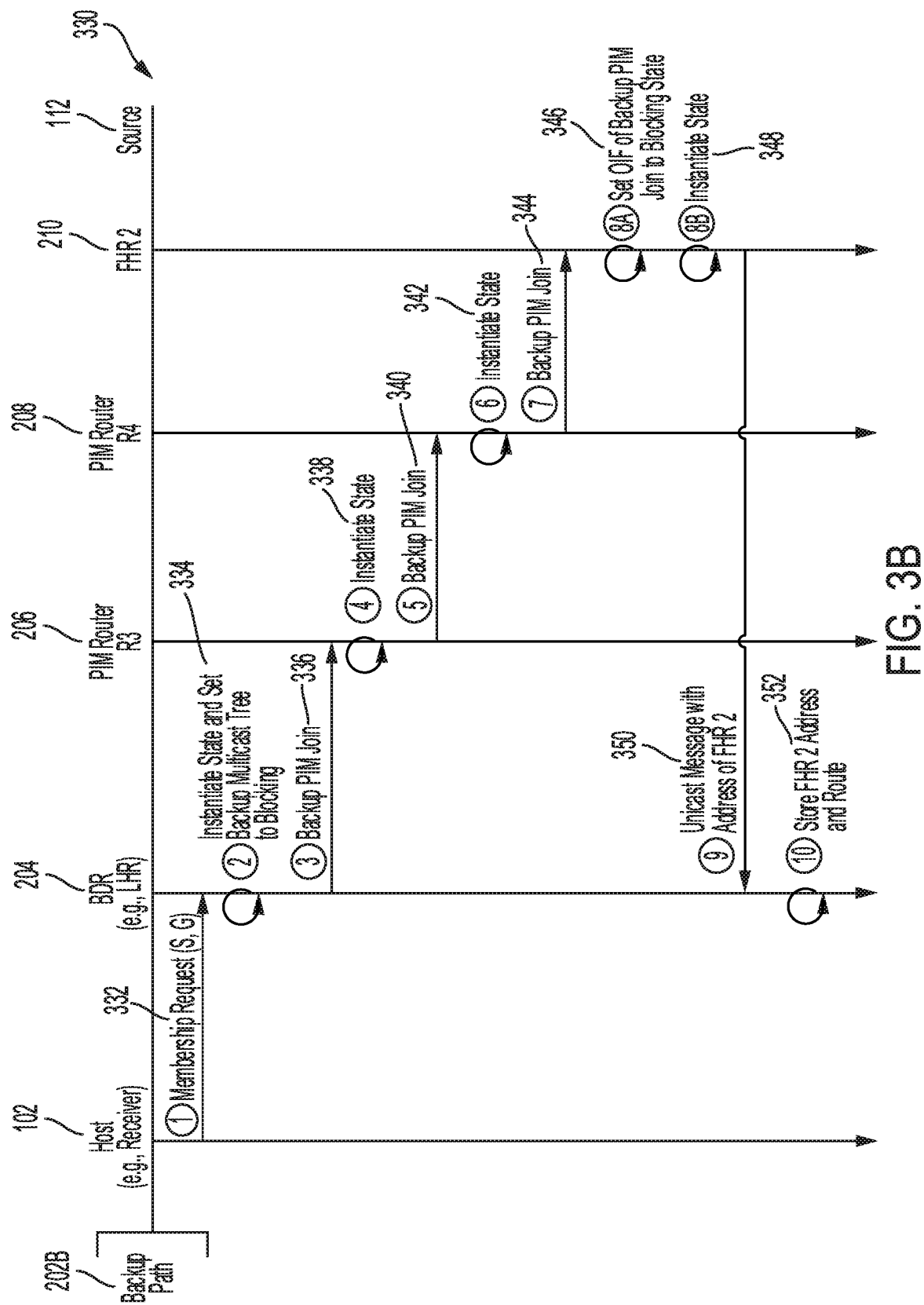
FIG. 3B illustrates an example flow for processing backup PIM joins associated with a multicast group and source, in accordance with some examples.

FIG. 3B illustrates an example flow 330 for processing backup PIM joins (e.g., backup (S, G) joins) associated with a multicast group (G) and source 112 (S). For illustrative and explanation purposes, the flow 330 in this example is described with reference to the deployment 200 shown in FIG. 2A.

At step 332, PIM BDR 204 receives from the host 102 a multicast group membership request (S, G) associated with the multicast group G and source 112. At step 334, the PIM BDR 204 receives the membership request and subsequently instantiates backup multicast tree state and sets the backup multicast tree to blocking or non-forwarding. At step 336, the PIM BDR 204 sends a backup PIM join to PIM router 206 on the backup path 202B.

At step 338, the PIM router 206 receives the backup PIM join and instantiates the backup multicast tree state associated with the backup PIM join. At step 340, the PIM router 206 forwards the backup PIM join to the PIM router 208.

At step 342, the PIM router 208 receives the backup PIM join and instantiates the backup multicast tree state associated with the backup PIM join. At step 344, the PIM router 208 forwards the backup PIM join to the FHR 210.

At step 346, the FHR 210 can receive the backup PIM join and set the outgoing interface (OIF) of the backup PIM join to blocking state. At step 348, the FHR 210 also instantiates the backup multicast tree state associated with the backup PIM join. At this point, the full backup multicast tree has been created for the backup path 202B.

At step 350, the FHR 210 sends to the PIM BDR 204 a unicast message including an address (e.g., a loopback IP address) of the FHR 210. The address of the PIM 210 can be included as part of the unicast message (e.g., in the header). At step 352, the PIM BDR 204 receives the unicast message, and stores the address of the FHR 210 in the unicast message and the route traversed by the unicast message from the FHR 210 to the PIM BDR 204. At this point, the PIM BDR 204 has an address it can use to send unicast communications to the PIM 210 in order to perform PIM operations such as a designated router migration as described herein. Similarly, the FHR 210 has the address of the PIM BDR 204 included in the backup PIM join message), which the FHR 210 can also use to send unicast communications to the PIM BDR 204. Moreover, the PIM BDR 204 knows from the route of the unicast message each of the hops along the backup path 202B.

Figure 3C:
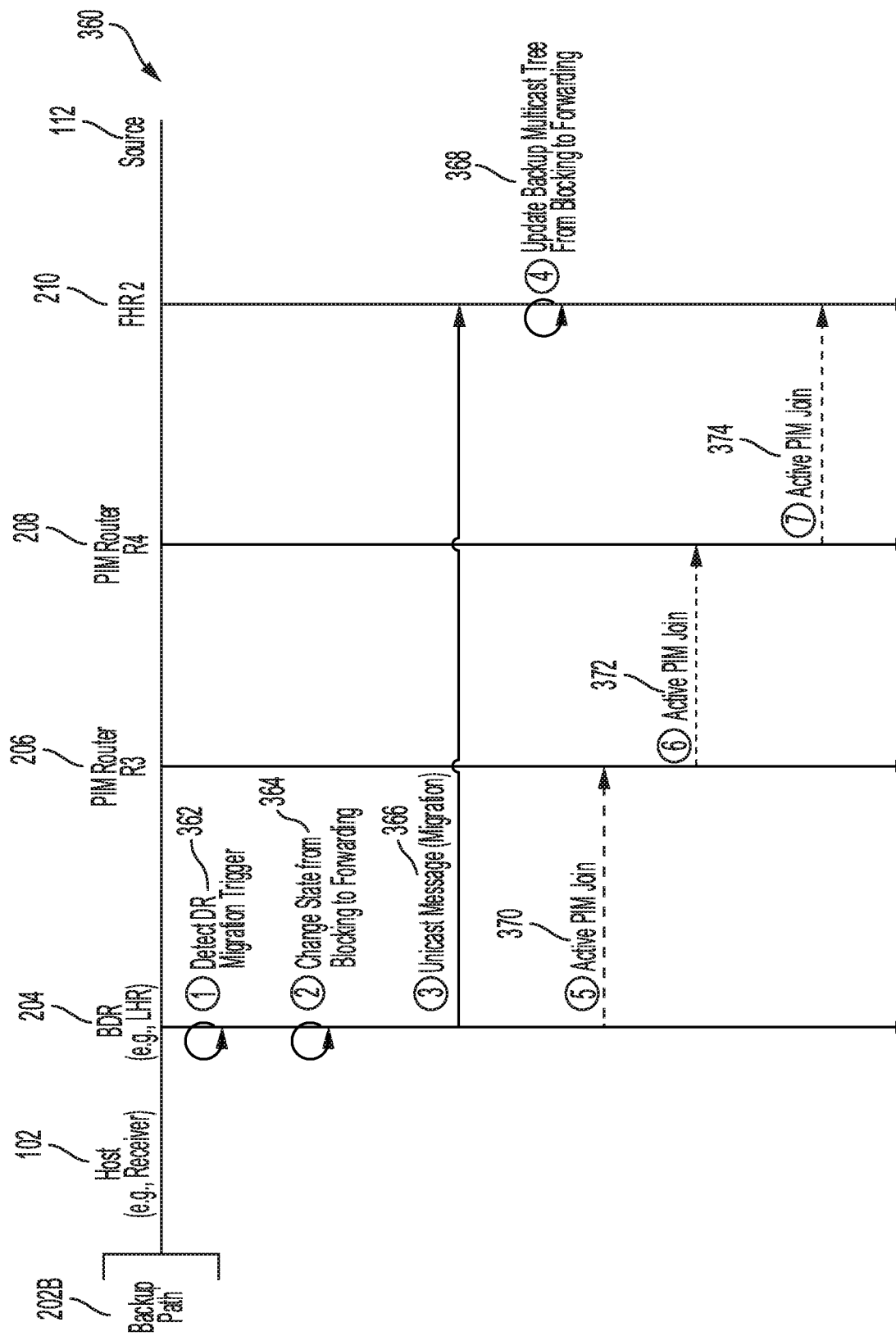
FIG. 3C illustrates an example flow for performing a designated router migration, in accordance with some examples.

FIG. 3C illustrates an example flow 360 for performing a designated router migration. For illustrative and explanation purposes, the flow 360 in this example is described with reference to the deployment 200 shown in FIG. 2A.

At step 362, PIM BDR 204 detects a DR migration trigger. The DR migration trigger can be any condition, activity or event configured to trigger the migration of the DR role and/or active multicast tree state from the active PIM DR 104 to a backup or standby PIM DR (e.g., PIM BDR 204). For example, the DR migration trigger can be an access interface failure (e.g., an access interface going down), a core link failure, a failure experienced by one or more PIM routers (e.g., one or more PIM routers going down), and/or any other event or condition that may interfere with or cause errors or disruption with multicast routing and communications using a currently-active path and/or PIM DR (e.g., 104). The DR migration trigger can thus trigger migration of DR roles and multicast tree states (e.g., from an active to a backup multicast tree state and vice versa).

At step 364, upon detecting the DR migration trigger, the PIM BDR 204 can change its state from blocking to forwarding, which allows the backup multicast tree hosted by the PIM BDR 204 to become active for routing associated multicast traffic. At step 366, the PIM BDR 204 sends a unicast message to the FHR 210, instructing the FHR 210 to start forwarding traffic using the backup multicast tree (which has since been migrated from backup to active). In some cases, the PIM BDR 204 can send multiple unicast messages to the FHR 210 in case of packet loss in the network. Moreover, in some cases, upon becoming the active PIM DR, in addition to sending the unicast message to the FHR 210, the PIM BDR 204 can also start sending active PIM join messages.

At step 368, upon receiving the unicast message from the PIM BDR 204, the FHR 210 updates its state (e.g., the backup multicast tree state) from blocking to forwarding. At this point, the FHR 210 can start forwarding traffic using the backup multicast tree that has been set as the active tree and enabled for forwarding.

At step 370, the PIM BDR 204 can send active PIM joins, which will start propagating from the PIM BDR 204. At step 372, the PIM router 206 receives the active PIM joins from the PIM BDR 204, processes them, and forwards them to the next hop (e.g., PIM router 208). At step 374, the PIM router 208 similarly receives the active PIM joins, processes them, and forwards them to the next hop (e.g., FHR 210).

Figure 4A:
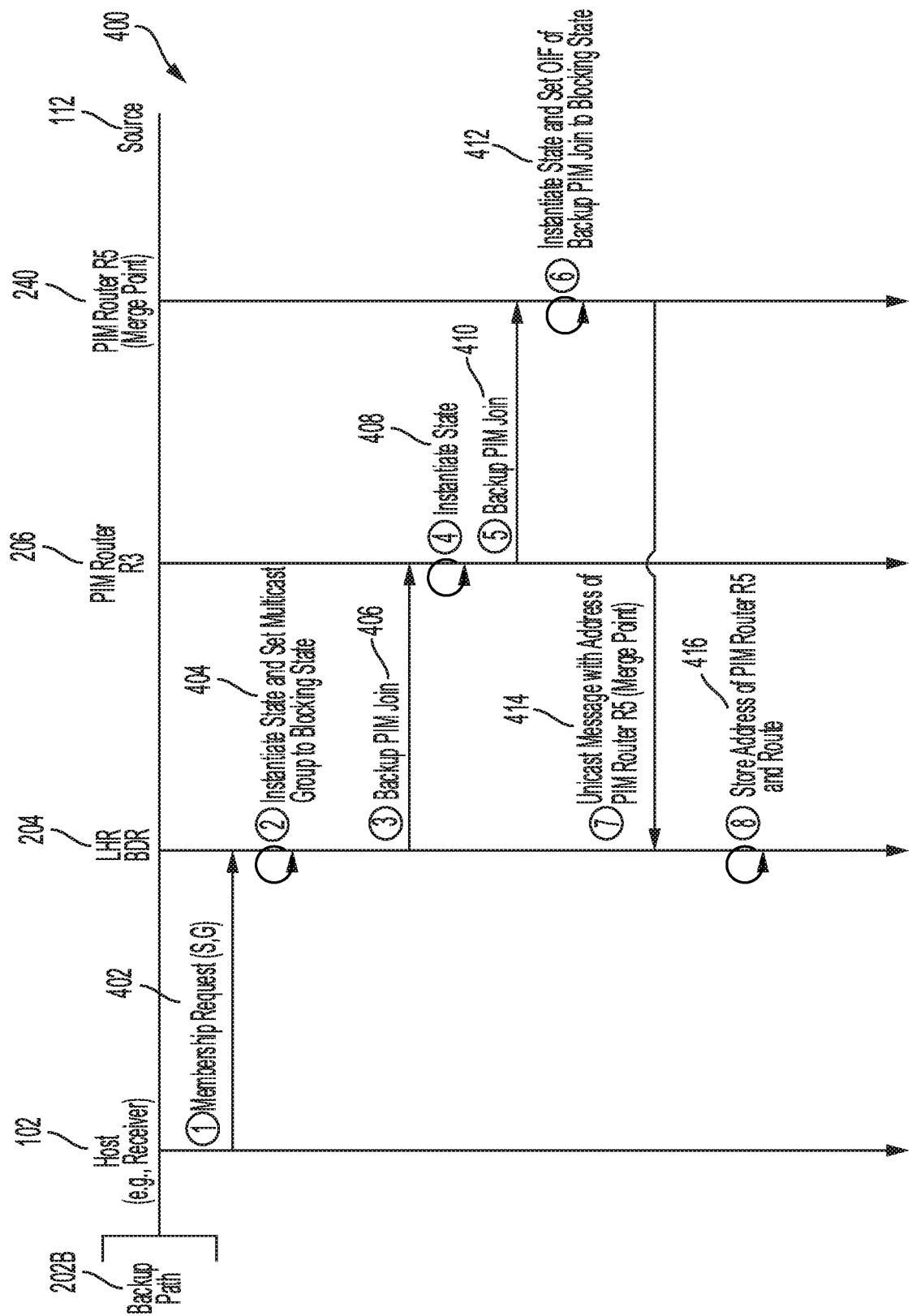
FIG. 4A illustrates an example flow for processing backup PIM joins associated with a multicast group and source in an example topology with a merged path, in accordance with some examples.

FIG. 4A illustrates an example flow 400 for processing backup PIM joins (e.g., backup (S, G) joins) associated with a multicast group (U) and source 112 (S) in an example topology with a merged path. For illustrative and explanation purposes, the flow 400 in this example is described with reference to the deployment 230 shown in FIG. 2B, which includes a topology with a merged path.

At step 402, PIM BDR 204 receives from the host 102 (e.g., through backup path 202B) a multicast group membership request (S, G) associated with the multicast group G and source 112. At step 402, the PIM BDR 204 receives the membership request and instantiates backup multicast tree state and sets the backup multicast tree to blocking or non-forwarding. At step 406, the PIM BDR 204 sends a backup PIM join to PIM muter 206 on the backup path 202B.

At step 408, the PIM router 206 receives the backup PIM join and instantiates the backup multicast tree state associated with the backup PIM join. At step 410, the PIM router 206 forwards the backup PIM join to the PIM router 208.

At step 412, the PIM router 240 (e.g., the merge point) receives the backup PIM join, instantiates the backup multicast tree state associated with the backup PIM join, and sets the OIF of the backup PIM join to blocking state. At step 414, the PIM router 240 then sends a unicast message, which includes an address (e.g., a loopback IP address) of the PIM router 240, to PIM BDR 204. The address of the PIM router 240 can be included as part of the unicast message (e.g., in the header).

At step 416, the PIM BDR 204 receives the unicast message, and stores the address of the PIM router 240 in the unicast message and the route traversed by the unicast message from the PIM router 240 to the PIM BDR 204. At this point, the PIM BDR 204 has an address it can use to send unicast communications to the merge point (e.g., PIM router 240) in order to perform PIM operations such as a designated router migration as described herein. Similarly, the PIM router 240 has the address of the PIM BDR 204 (e.g., included in the backup PIM join message), which the PIM router 240 can also use to send unicast communications to the PIM BDR 204. Moreover, the PIM BDR 204 knows from the route of the unicast message each of the hops along the backup path 202B.

Figure 4B:
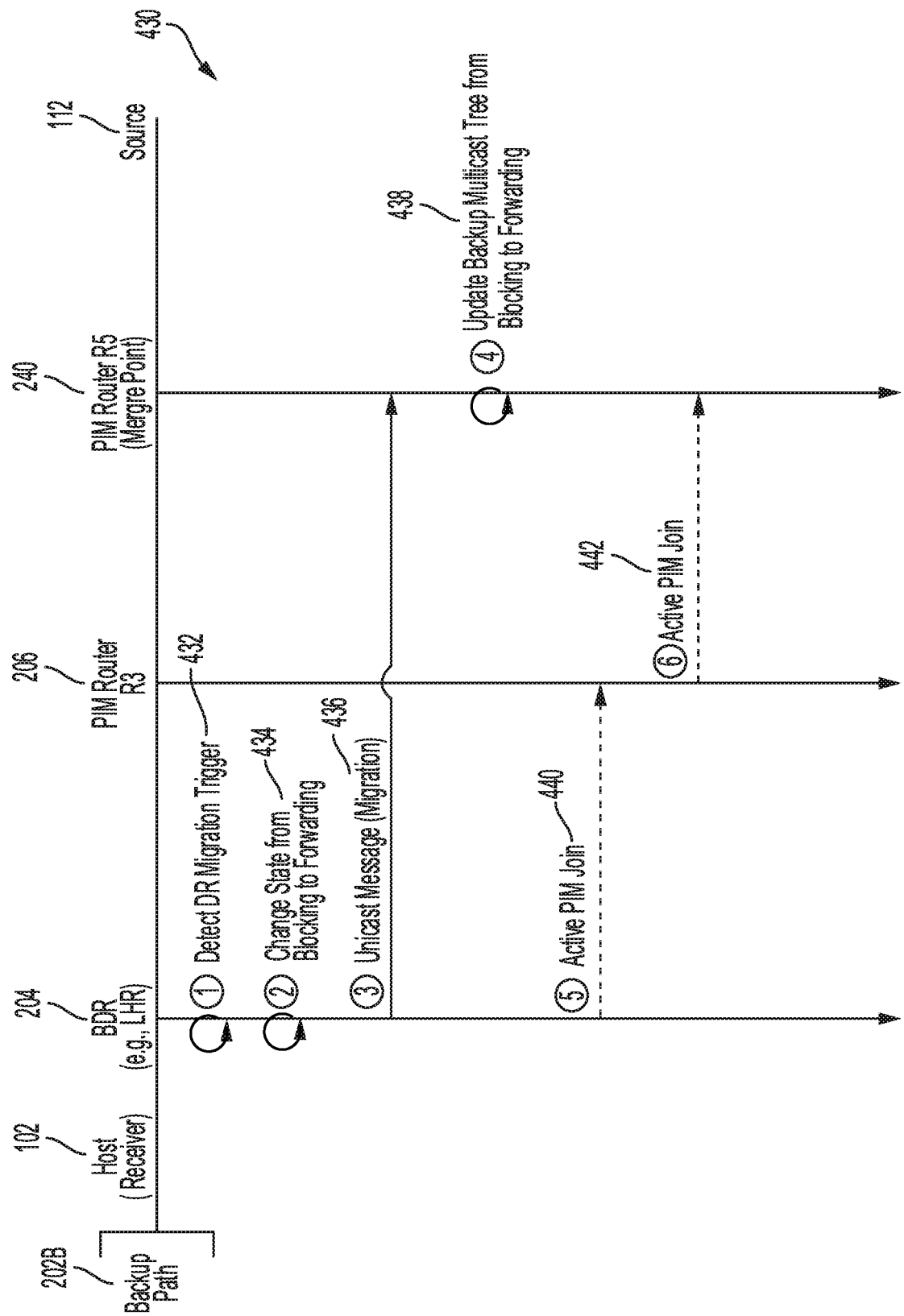
FIG. 4B illustrates an example flow for performing a designated router migration in an example topology with a merged path, in accordance with some examples.

FIG. 4B illustrates an example flow 430 for performing a designated router migration in an example topology with a merged path. For illustrative and explanation purposes, the flow 430 in this example is described with reference to the deployment 230 shown in FIG. 2B, which includes a topology with a merged path.

At step 432, PIM BDR 204 detects a DR migration trigger that initiates the DR migration. The DR migration trigger can be any condition, activity or event configured to trigger the migration of the DR role and/or active multicast tree state from the active PIM DR 104 to a backup or standby PIM DR (e.g., PIM BDR 204). For example, the DR migration trigger can be an access interface failure (e.g., an access interface going down), a core link failure, a failure experienced by one or more PIM routers (e.g., one or more PIM routers going down), and/or any other event or condition that may interfere with or cause errors or disruption with multicast routing and communications using a currently-active path and/or PIM DR (e.g., 104). The DR migration trigger can thus trigger migration of DR roles and multicast tree states (e.g., from an active to a backup multicast tree state and vice versa).

At step 434, upon detecting the DR migration trigger, the PIM BDR 204 can change its state from blocking to forwarding, which a lows the backup multicast tree hosted by the PIM BDR 204 to become active for routing associated multicast traffic. At step 436, the PIM BDR 204 sends a unicast message to the merge point, PIM router 240. The unicast message can instruct the PIM router 240 to start forwarding traffic using the backup multicast tree (which has since been migrated from backup to active). The unicast message can include an address of the PIM BDR 204. The address of the PIM BDR 204 can be included as part of the unicast message (e.g., in the header of the unicast message). In some cases, the PIM BDR 204 can send multiple unicast messages to the PIM router 240 in case of packet loss in the network.

At step 438, upon receiving the unicast message from the PIM BDR 204, the PIM router 240 updates its state (e.g., the backup multicast tree state) from blocking to forwarding. At this point, the PIM router 240 can start forwarding traffic using the backup multicast tree that has been set as the active tree and enabled for forwarding.

At step 440, the PIM BDR 204 can send active PIM joins, which will start propagating from the PIM BDR 204. At step 442, the PIM router 206 receives the active PIM joins from the PIM BDR 204, processes them, and forwards them to the next hop (e.g., PIM router 240). The PIM router 240 can receive the active PIM joins from the PIM router 206 and similarly process them.

Figure 5:
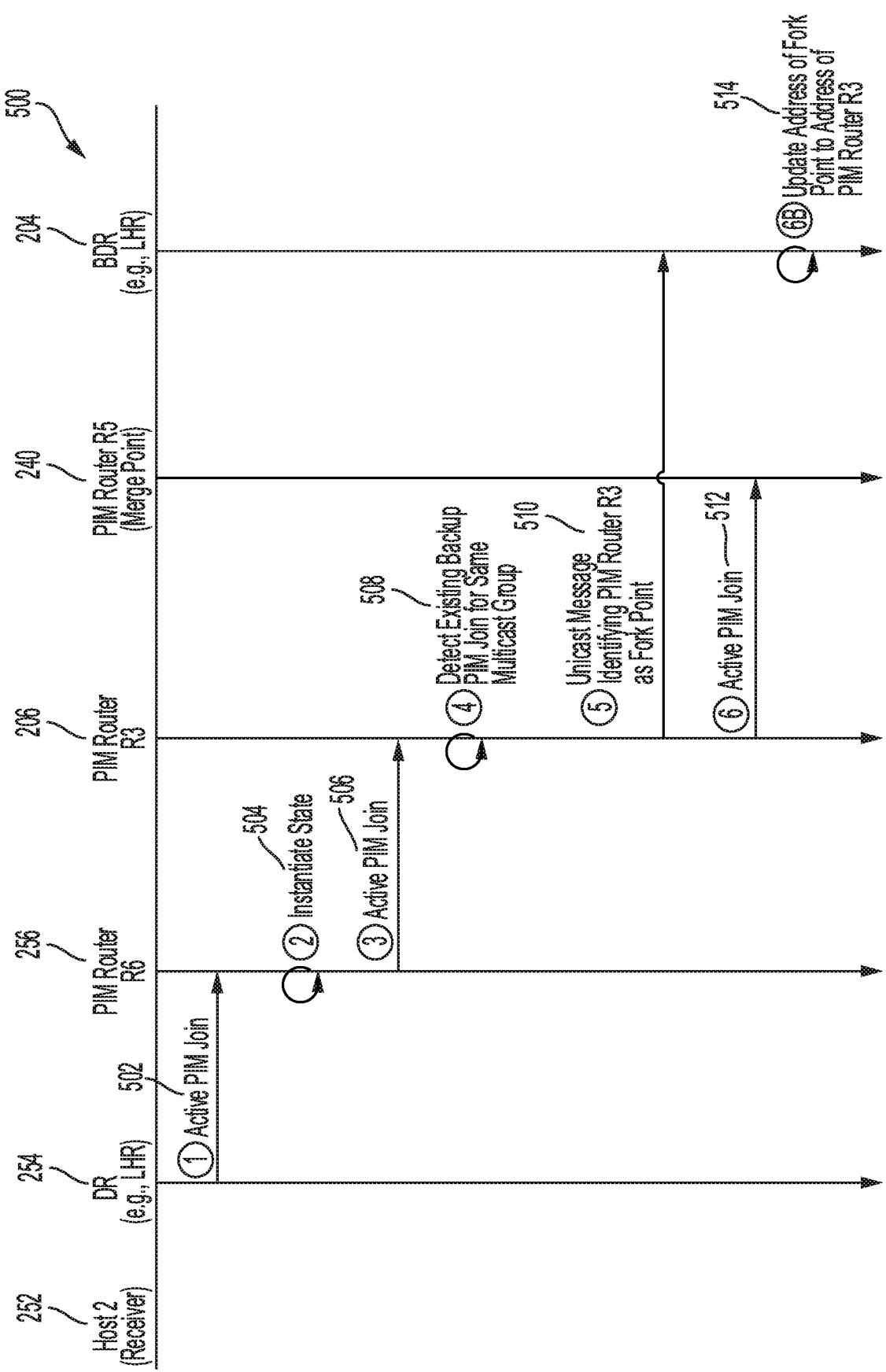
FIG. 5 illustrates an example flow for processing active PIM joins associated with a multicast group and source in an example topology with a merged path and a network that overlaps with a current backup multicast distribution tree, in accordance with some examples.

FIG. 5 illustrates an example flow 500 for processing active PIM joins (e.g., active (S, G) joins) associated with a multicast group (G) and source 112 (S) in an example topology with a merged path and a network that overlaps with a current backup multicast distribution tree. For illustrative and explanation purposes, the flow 500 in this example is described with reference to the deployment 250 shown in FIG. 2C.

At step 502, PIM DR 254 (in the overlapping network 260) receives from host 252 a multicast group membership (S, G) associated with the multicast group G and source 112. The membership request can be a transmitted by the host 252 using IGMP or any other suitable communications protocol. The membership request can indicate that the host 252 is interested in receiving multicast traffic associated with multicast group G from source 112.

At step 504, the PIM DR 254 can instantiate the multicast tree state. At step 506, the PIM DR 254 can send an active PIM join to PIM router 256 on path 258.

At step 508, the PIM router 206 can receive the active PIM join and detect an existing backup PIM join for the same multicast group (e.g., (S, G)). The existing backup PIM join can be a backup PIM join previously received by the PIM router 206 from the PIM BDR 204.

In response to detecting the existing backup PIM join for the same multicast group, at step 510, the PIM router 206 can send a unicast message to the backup PIM join originator (e.g., PIM BDR 204), indicating that the PIM router 206 is a fork or merge point for the backup multicast tree. At step 512, the PIM router 206 can also send an active PIM join to PIM router 240, which is also a merge point for the active path 202A and the backup path 202B.

Based on the unicast message from PIM router 206, at step 514, the PIM BDR 204 can then update its fork point entry to include the address of the PIM router 206, which is now a fork point for path 258 and backup path 202B. Each hop after PIM router 206 can continue making its state to the active multicast tree.

Figure 6:
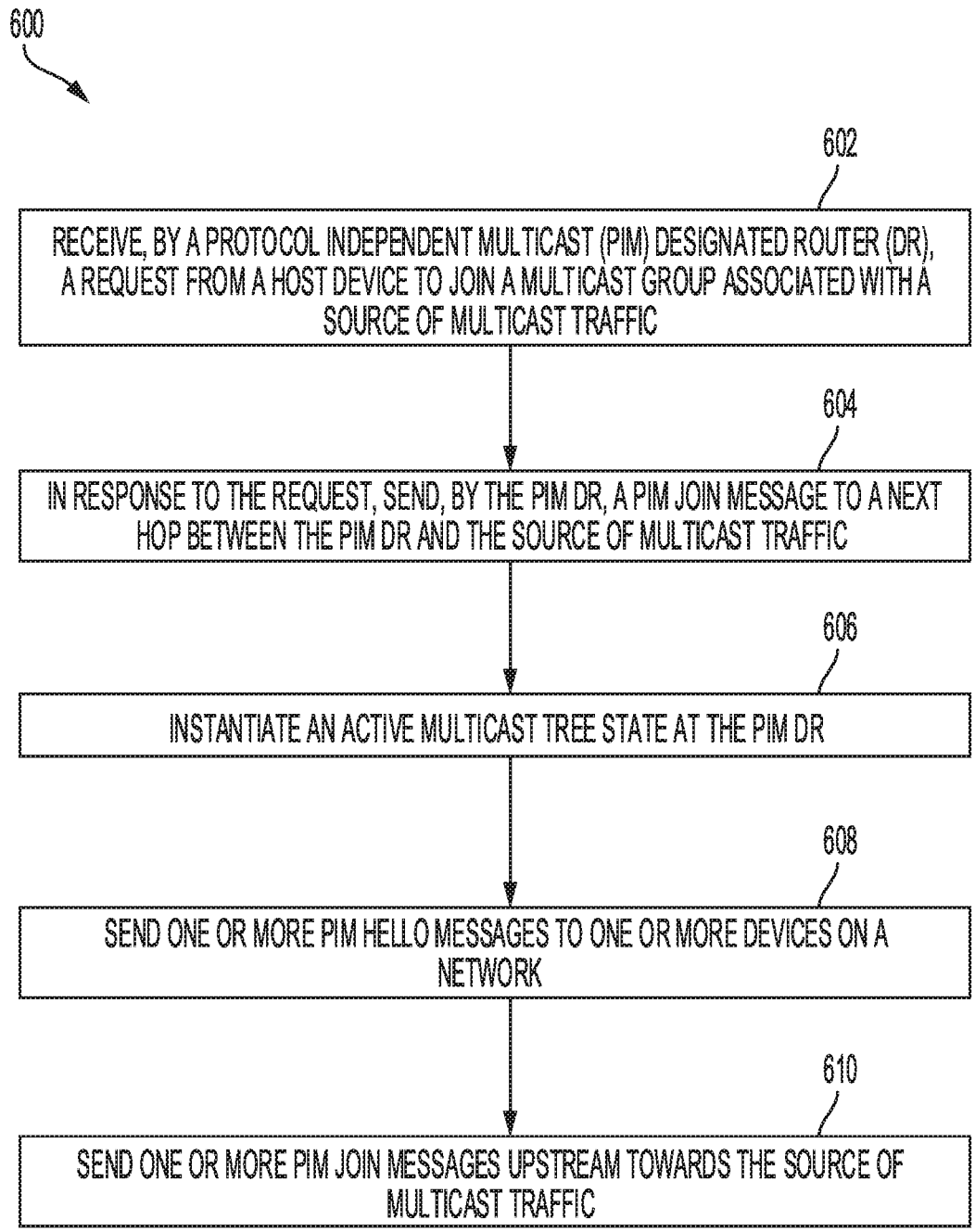
FIG. 6 illustrates an example method for establishing an active PIM DR, an active multicast tree state, and an active multicast path, in accordance with some examples.
Figure 7:
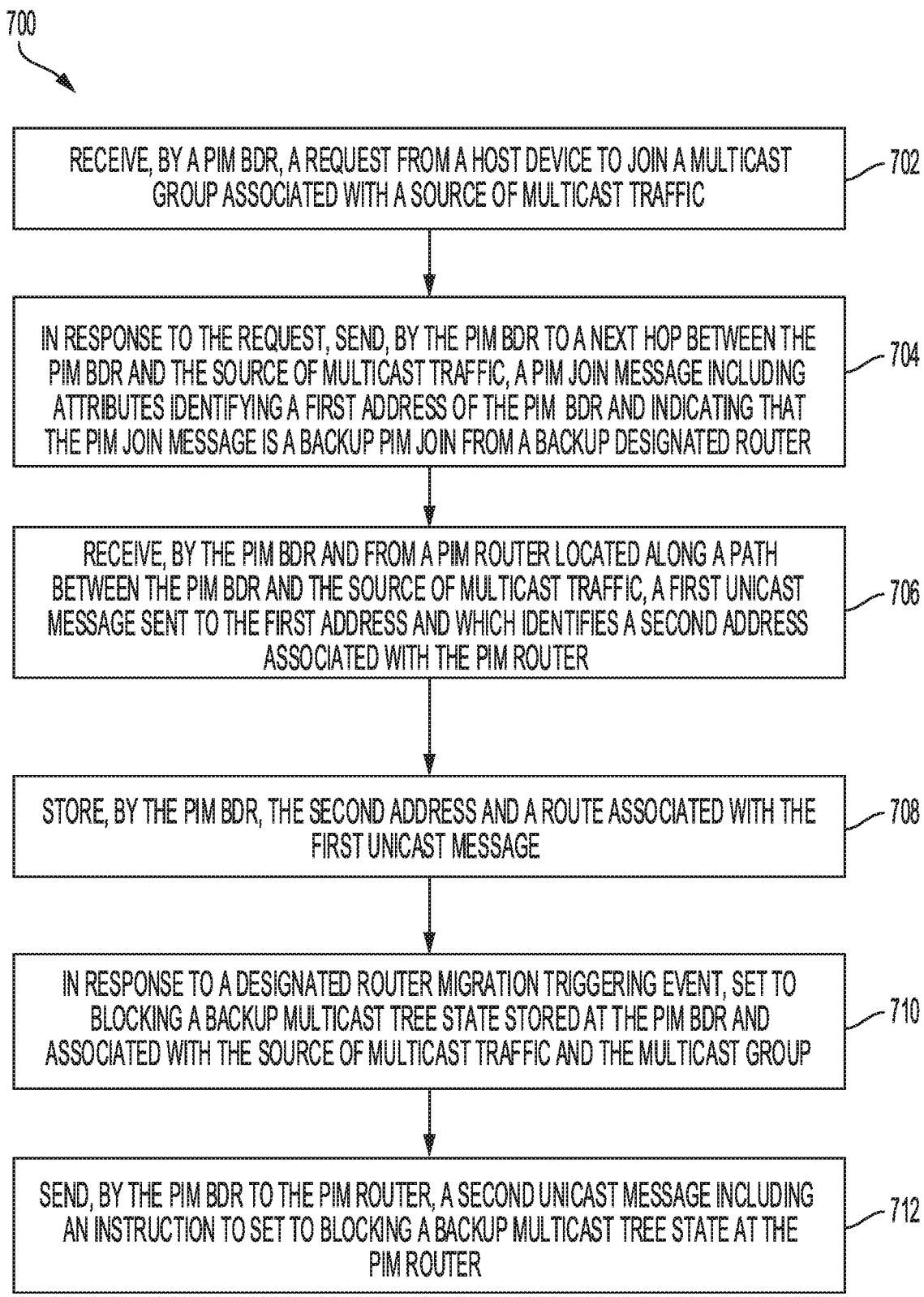
FIG. 7 illustrates an example method for establishing a backup PIM DR and backup multicast path, and performing a DR migration, in accordance with some examples.
Figure 8:
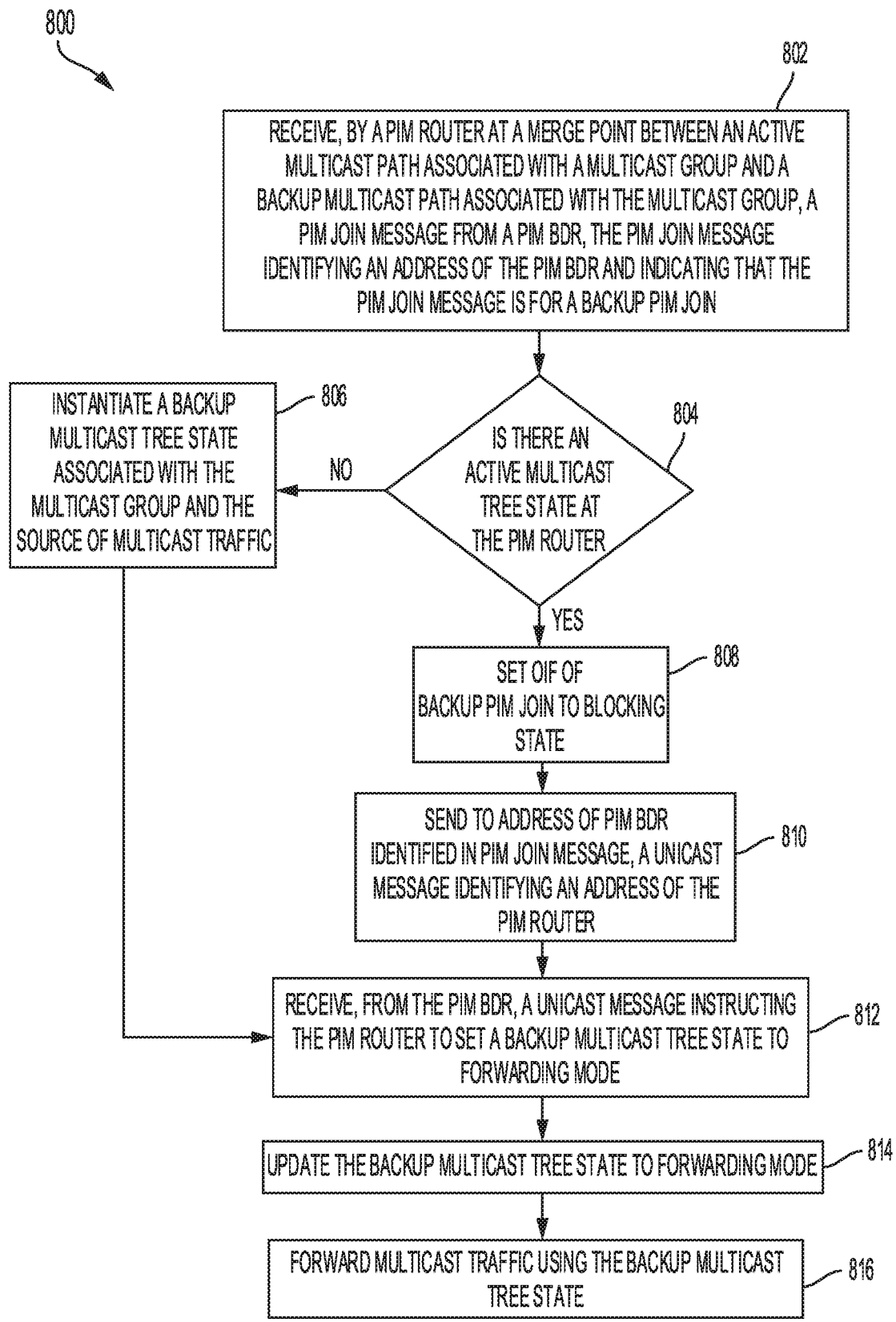
FIG. 8 illustrates a flowchart of an example method for processing PIM join messages and performing a DR migration at a merge point in a PIM deployment, in accordance with some examples.

Having described example systems and concepts, the disclosure now turns to the methods illustrated in FIGS. 6, 7, and 8. The steps outlined herein are examples and can be implemented in any combination thereof, including combinations that exclude, add, or modify certain steps.

FIG. 6 illustrates an example method 600 for establishing an active PIM DR (e.g., PIM BDR 104), an active multicast tree state, and an active multicast path (e.g., 202A). In this example, at step 602, the method 600 includes receiving, by a PIM DR (104), a request (302) from a host device (102) to join a multicast group (e.g., (S, G)) associated with a source (112) of multicast traffic.

In response to the request (302), at step 604, the method 600 can include sending, by the PIM DR (104), an active PIM join message (306) to a next hop (e.g., PIM router 106) between the PIM DR (104) and the source (112) of multicast traffic (or a merge point). At step 606, the PIM DR (104) can also instantiate an active multicast tree state for the multicast group. Moreover, at step 608, the PIM DR (104) can send one or more (or periodic) PIM hello messages to one or more devices on the PIM DR's network (e.g., 140) or shared LAN. The PIM DR (104) can use hello message s to detect other PIM routers.

Hello messages can be sent periodically on each PIM enabled interface. In some cases, hello messages can be multicast to the ALL-PIM-ROUTERS group. When PIM is enabled on an interface or when a router first starts, a Hello Timer (HT) is set to a value between 0 and a hello delay (e.g., Triggered_Hello_Delay). This can prevent synchronization of hello messages if multiple routers are powered on simultaneously. After the initial hello message, a hello message can be sent periodically (e.g., every Hello_Period). A hello timer can be used to trigger sending hello messages on active interfaces.

At step 610, the method 600 can include sending, by the PIM DR (104), one or more PIM join messages towards the source (112) of the multicast traffic (e.g., upstream). In some cases, the PIM DR, (104) can send periodic join messages upstream.

FIG. 7 illustrates an example method 700 for establishing a backup PIM DR (e.g., PIM BDR 204) and backup multicast path (e.g., 202B), and performing a DR migration. In this example, at step 702, the method 700 includes receiving, by a PIM BDR (204), a request (332) from a host device (102) to join a multicast group (e.g., (S, G)) associated with a source (112) of multicast traffic.

At step 704, the method 700 can include, in response to the request (332), sending, by the PIM BDR (204), a PIM join message (e.g., backup PIM join 336) to a next hop (e.g., PIM router 206) between the PIM BDR (204) and the source (112) of multicast traffic. The PIM join message (e.g., backup PIM join 336) can include attributes identifying an address of the PIM BDR (204) and indicating that the PIM join message is a backup PIM join from a backup designated router.

At step 706, the method 700 can include receiving, by the PIM BDR (204), from a PIM router (e.g., FHR 210) located along a path (e.g., 202B) between the PIM BDR (204) and the source (112) of multicast traffic, a unicast message sent to the address of the PIM BDR (204). The unicast message can identify an address of the PIM router (e.g., FHR 210). The PIM router (e.g., FHR 210) can use the address included in the PIM join message sent by the PIM BDR (204) at step 704 and received by the PIM router (e.g., FHR 210). Since the PIM BDR (204) and the PIM router (e.g., FHR 210), which can be a merge point or a first hop router, have each others' addresses, they can communicate using unicast messaging to exchange any PIM-related information.

At step 708, the method 700 can include storing, by the PIM BDR (104), the address of the PIM router (e.g., FHR 210) and a route associated with the unicast message from the PIM router (e.g., FHR 210) to the PIM BDR (104).

At step 710, the method 700 can include, in response to a designated router migration triggering event, changing an instance of a backup multicast tree state at the PIM BDR (104) from blocking to forwarding. The backup multicast tree state can include the backup multicast tree associated with the source (112) of multicast traffic and the multicast group (e.g., (S, G)). For example, when the PIM BDR (104) detects a DR migration trigger, as previously explained, it can change its state to forwarding in order to activate and use the backup multicast tree for subsequent multicast traffic associated with the multicast group.

At step 712, the method 700 can include sending, by the PIM BDR (204) to the PIM router (e.g., FHR 210), a unicast message including an instruction to change an instance of the backup multicast tree state at the PIM router (e.g., FHR 210) from blocking to forwarding. The PIM BDR (204) can send the unicast message using the PIM router's address obtained from the PIM router at step 706. When the PIM router (e.g., FHR 210) receives the unicast message sent by the PIM BDR (204) in step 712, the PIM router can update its state (e.g., the backup multicast tree state) to forwarding mode and subsequently begin actively using the state to forward multicast traffic associated with the multicast group.

FIG. 8 illustrates a flowchart of an example method 800 for processing PIM join messages and performing a DR migration at a merge point (e.g., PIM router 240 in deployment 230, PIM router 206 in deployment 250) in a PIM deployment 230, 250). In this example, at step 802, the method 800 can include receiving, by a PIM router (e.g., 240, 206) at a merge point between an active multicast path (e.g., 202A) associated with a multicast group (e.g., (S, G)) and a backup multicast path (e.g., 202B) associated with the multicast group, a PIM join message (e.g., 410) from a PIM BDR (104). The PIM join message can identify an address of the PIM BDR (204) and can indicate that the PIM join message is for a backup PIM join.

At step 804, the method 800 can include determining whether an active multicast tree state already exists at the PIM router (e.g., 240, 206). If an active multicast tree state already does exist at the PIM router, at step 806, the method 800 can include instantiating at the PIM router (e.g., 240, 206) a backup multicast tree state associated with the multicast group and the source of the multicast traffic (e.g., (S, G)). Once the backup multicast tree state has been instantiated at the PIM router (e.g., 240, 206), the method 800 can proceed to step 812 described below.

If, on the other hand, the method 800 at step 804 determines that an active multicast tree state does not exist at the PIM router, the method 800 proceeds to step 808, which can include setting the OIF of the backup PIM join the PIM join message received at step 802 from the PIM BDR) to a blocking state.

At step 810, the method 800 can include sending (e.g., by the PIM router) to the address of the PIM BDR (204) identified in the PIM join message (e.g., 410), a unicast message including an address of the PIM router (e.g., 240, 206). The address in the unicast message will allow the PIM BDR (204) to send unicast messages to the PIM router (e.g., 240, 206).

At step 812, the method 800 can include receiving, at the PIM router (e.g., 240, 206) and from the PIM BDR (204), a unicast message instructing the PIM router (e.g., 240, 206) to update a backup multicast tree state to forwarding mode. The unicast message can be sent using the address included in the unicast message sent at step 810. Moreover, the instruction to update a backup multicast tree state to forwarding mode can be in response to a DR migration event which triggers migration of the PIM BDR (204) and the backup multicast path (202B) from backup to active. Thus, updating the backup multicast tree state to forwarding mode will allow the PIM router 240, 206) to activate and use the backup multicast tree state to forward associated multicast traffic.

At step 814, the method 800 can include updating, by the PIM router (e.g., 240, 206), the backup multicast tree state to forwarding mode. The PIM router (e.g., 240, 206) can update the backup multicast tree state to forwarding mode in response to the unicast message at step 812 instructing the PIM router 240, 206) to update the backup multicast tree state to forwarding mode. At step 816, the method 800 can include forwarding multicast traffic associated with the multicast group (e.g., (S, G)) using the backup multicast tree state.

The disclosure now turns to FIGS. 9 and 10, which illustrate example network devices and computing devices, such as switches, routers, client devices, endpoints, servers, and so forth.

FIG. 9 illustrates an example network device 900 suitable for implementing PIM routing and performing switching, routing, and other networking operations. Network device 900 includes a central processing unit (CPU) 904, interfaces 902, and a connection 910 (e.g., a PCI bus). When acting under the control of appropriate software or firmware, the CPU 904 is responsible for executing packet management, error detection, and/or routing functions. The CPU 904 preferably accomplishes all these functions under the control of software including an operating system and any appropriate applications software. CPU 904 may include one or more processors 908, such as a processor from the INTEL X96 family of microprocessors. In some cases, processor 908 can be specially designed hardware for controlling the operations of network device 900. In some cases, a memory 906 (e.g., non-volatile RAM, ROM, etc.) also forms part of CPU 904. However, there are many different ways in which memory could be coupled to the system.

The interfaces 902 are typically provided as modular interface cards (sometimes referred to as "line cards"). Generally, they control the sending and receiving of data packets over the network and sometimes support other peripherals used with the network device 900. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the master microprocessor 904 to efficiently perform routing computations, network diagnostics, security functions, etc.

Although the system shown in FIG. 9 is one specific network device of the present technologies, it is by no means the only network device architecture on which the present technologies can be implemented. For example, an architecture having a single processor that handles communications as well as routing computations, etc., is often used. Further, other types of interfaces and media could also be used with the network device 900.

Regardless of the network device's configuration, it may employ one or more memories or memory modules (including memory 906) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 906 could also hold various software containers and virtualized execution environments and data.

The network device 900 can also include an application-specific integrated circuit (ASIC) 912, which can be configured to perform routing and/or switching operations. The ASIC 912 can communicate with other components in the network device 900 via the connection 910, to exchange data and signals and coordinate various types of operations by the network device 900, such as routing, switching, and/or data storage operations, for example.

FIG. 10 illustrates a computing system architecture 1000 wherein the components of the system are in electrical communication with each other using a connection 1005, such as a bus. Exemplary system 1000 includes a processing unit (CPU or processor) 1010 and a system connection 1005 that couples various system components including the system memory 1015, such as read only memory (ROM) 1020 and random access memory (RAM) 1025, to the processor 1010. The system 1000 can include a cache of high-speed memory connected directly with, in close proximity to, or integrated as part of the processor 1010. The system 1000 can copy data from the memory 1015 and/or the storage device 1030 to the cache 1012 for quick access by the processor 1010. In this way, the cache can provide a performance boost that avoids processor 1010 delays while waiting for data. These and other modules can control or be configured to control the processor 1010 to perform various actions. Other system memory 1015 may be available for use as well. The memory 1015 can include multiple different types of memory with different performance characteristics. The processor 1010 can include any general purpose processor and a hardware or software service, such as service 1 1032, service 2 1034, and service 3 1036 stored in storage device 1030, configured to control the processor 1010 as well as a special-purpose processor where software instructions are incorporated into the actual processor design. The processor 1010 may be a completely self-contained computing system, containing multiple cores or processors, a bus, memory controller, cache, etc. A multi-core processor may be symmetric or asymmetric.

To enable user interaction with the computing device 1000, an input device 1045 can represent any number of input mechanisms, such as a microphone for speech, a touch-sensitive screen for gesture or graphical input, keyboard, mouse, motion input, speech and so forth. An output device 1035 can also be one or more of a number of output mechanisms known to those of skill in the art. In some instances, multimodal systems can enable a user to provide multiple types of input to communicate with the computing device 1000. The communications interface 1040 can generally govern and manage the user input and system output. There is no restriction on operating on any particular hardware arrangement and therefore the basic features here may easily be substituted for improved hardware or firmware arrangements as they are developed.

Storage device 1030 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1025, read only memory (ROM) 1020, and hybrids thereof.

The storage device 1030 can include, services 1032, 1034, 1036 for controlling the processor 1010. Other hardware or software modules are contemplated. The storage device 1030 can be connected to the system connection 1005. In one aspect, a hardware module that performs a particular function can include the software component stored in a computer-readable medium in connection with the necessary hardware components, such as the processor 1010, connection 1005, output device 1035, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

What is claimed is:

1. A method comprising:
receiving, by a protocol independent multicast (PIM) backup designated router (BDR), a request from a host device to join a multicast group associated with a source of multicast traffic;
generating, by the PIM BDR in response to the request, a PIM join message that comprises attributes identifying a first address of the PIM BDR and indicating that the PIM join message is a backup PIM join from a backup designated router;
sending, by the PIM BDR, the PIM join message towards the source of multicast traffic to a next hop between the PIM BDR and the source of multicast traffic;
receiving, by the PIM BDR, from a PIM router located along a path between the PIM BDR and the source of multicast traffic, a first unicast message sent to the first address, the first unicast message identifying a second address associated with the PIM router;

storing, by the PIM BDR, the second address associated with the PIM router and a route used in delivering the first unicast message to the PIM BDR;

in response to a designated router migration triggering event, changing a first instance of a backup multicast tree state at the PIM BDR from blocking to forwarding, the backup multicast tree state being associated with the source of multicast traffic and the multicast group; and sending, by the PIM BDR to the PIM router through the route used in delivering the first unicast message to the PIM BDR, a second unicast message comprising an instruction to change a second instance of the backup multicast tree state at the PIM router from blocking to forwarding.

2. The method of claim 1, wherein changing the first instance of the backup multicast tree state from blocking to forwarding and sending the second unicast message comprises changing a role of the PIM BDR from backup DR to active PIM DR.

3. The method of claim 2, further comprising sending, by the active PIM DR to the next hop, one or more PIM join messages comprising active PIM joins, the one or more PIM join messages being sent at one or more intervals.

4. The method of claim 1, wherein sending the PIM join message to the next hop comprises sending the PIM join message towards at least one of the source of multicast traffic and a merge point for an active multicast tree associated with the multicast group and a backup multicast tree associated with the multicast group.

5. The method of claim 1, wherein the PIM router comprises at least one of a first hop router (FHR) connected to the source of multicast traffic, a merge point between an active multicast tree associated with the multicast group and a backup multicast tree associated with the multicast group, and a rendezvous point (RP) router configured as a root of at least one of the active multicast tree and the backup multicast tree, the PIM router being downstream from the source of the multicast traffic and upstream from the PIM BDR.

6. The method of claim 5, wherein the PIM router comprises the merge point between the active multicast tree and the backup multicast tree, the PIM router being located between the PIM BDR and a different PIM router comprising at least one of the FHR and the RP router.

7. The method of claim 6, further comprising:
receiving, by the PIM router comprising the merge point, the PIM join message from the PIM BDR;
determining that the PIM router has previously received an active PIM join associated with the multicast group and has an active multicast tree state associated with the multicast group, the active PIM join being from an active PIM designated router (DR), and the active multicast tree state comprising the active multicast tree;
setting the second instance of the backup multicast tree state at the PIM router to a blocking state, wherein the second instance of the backup multicast tree state comprises the backup multicast tree; and
sending, by the PIM router, the first unicast message to the first address identified in the PIM join message from the PIM BDR, the first unicast message indicating that the PIM router is the merge point between the active multicast tree and the backup multicast tree.

8. The method of claim 5, further comprising:
receiving, by a different PIM router, an active PIM join associated with a second host device and the multicast group, wherein the different PIM router comprises a new merge point for the backup multicast tree and the active multicast tree, wherein the different PIM router is located along a path between the source of the multicast traffic and both the second host device and the PIM BDR;
determining that the different PIM router has previously received the backup PIM join and has a third instance of the backup multicast tree state associated with the multicast group, the third instance of the backup multicast tree state comprising the backup multicast tree;
setting the third instance of the backup multicast tree state to a blocking state;
sending, by the different PIM router, a third unicast message to the first address identified in the PIM join message from the PIM BDR, the third unicast message indicating that the different PIM router is the new merge point for the active multicast tree and the backup multicast tree; and
sending, by the different PIM router, a copy of the active PIM join to the PIM router, the copy of the active PIM join identifying a second address associated with the different PIM router and identifying the different PIM router as the new merge point.

9. The method of claim 8, further comprising:
in response to receiving the PIM join message sent by the PIM BDR, storing, by the PIM router, the second instance of the backup multicast tree state and a unicast address associated with a designated destination for unicast communications relating to at least one of the backup multicast tree and the active multicast tree, the unicast address comprising the first address of the PIM BDR;
in response to receiving the active PIM join, updating the unicast address to the second address of the different PIM router; and
updating the second instance of the backup multicast tree state at the PIM router based on the active PIM join.

10. The method of claim 1, further comprising:
receiving, by the next hop, the PIM join message from the PIM BDR;
in response to receiving the PIM join message, determining that the next hop does not have multicast tree state associated with the multicast group and the source of the multicast traffic;
instantiating the multicast tree state at the next hop;
storing, by the next hop, the first address associated with the PIM BDR as a unicast address associated with the PIM BDR; and
sending, by the next hop, a copy of the PIM join message towards the PIM router, the copy of the PIM join message identifying the first address associated with the PIM BDR.

11. The method of claim 1, wherein the designated router migration triggering event comprises at least one of a failure of a link between the PIM router and a PIM designated router (DR) associated with the multicast group and the source of the multicast traffic, a failure associated with the PIM DR, and a failure associated with one or more interfaces of one or more PIM routers located along an active path between the PIM DR and the PIM router.

12. A system comprising:
a protocol independent multicast (PIM) backup designated router (BDR) comprising one or more processors and at least one computer-readable storage medium having stored therein instructions which, when executed by the one or more processors, cause the PIM BDR to:

receive a request from a host device to join a multicast group associated with a source of multicast traffic;

generate, by the PIM BDR in response to the request, a PIM join message that comprises attributes identifying a first address of the PIM BDR and indicating that the PIM join message is a backup PIM join from a backup designated router;

send the PIM join message towards the source of multicast traffic to a next hop between the PIM BDR and the source of the multicast traffic;

receive, from a PIM router located along a path between the PIM BDR and the source of the multicast traffic, a first unicast message sent to the first address identified in the PIM join message, the first unicast message identifying a second address associated with the PIM router;

store the second address associated with the PIM router and a route used in delivering the first unicast message to the PIM BDR;

in response to a designated router migration triggering event, change a first instance of a backup multicast tree state at the PIM BDR from blocking to forwarding, the backup multicast tree state being associated with the source of the multicast traffic and the multicast group; and send, by the PIM BDR to the PIM router through the route used in delivering the first unicast message to the PIM BDR, a second unicast message comprising an instruction to change a second instance of the backup multicast tree state at the PIM router from blocking to forwarding.

13. The system of claim 12, wherein changing the first instance of the backup multicast tree state from blocking to forwarding and sending the second unicast message comprises designating the PIM BDR as an active PIM designated router (DR) and changing a role of the PIM BDR from backup designated router to active designated router, and wherein the at least one computer-readable storage medium stores additional instructions which, when executed by the one or more processors, cause the PIM BDR acting as the active PIM DR to:

send, to the next hop, one or more PIM join messages comprising active PIM joins, the one or more PIM join messages being sent at one or more intervals.

14. The system of claim 12, wherein the PIM router comprises a merge point between an active multicast tree associated with the multicast group and a backup multicast tree associated with the multicast group, the PIM router being located between the PIM BDR and a different PIM router comprising at least one of a first hop router (FHR) connected to the source of the multicast traffic and a rendezvous point (RP) router configured as a root of at least one of the active multicast tree and the backup multicast tree.

15. The system of claim 14, further comprising the PIM router, the PIM router comprising one or more additional processors and at least one additional computer-readable storage medium storing instructions which, when executed by the one or more additional processors, cause the PIM router to:

receive the PIM join message from the PIM BDR;

determine that the PIM router has previously received an active PIM join associated with the multicast group and has active multicast tree state associated with the multicast group, the active PIM join being from an active PIM designated router (DR), and the active multicast tree state comprising the active multicast tree;

set the second instance of the backup multicast tree state to a blocking state, wherein the second instance of the backup multicast tree state comprises the backup multicast tree; and send the first unicast message to the first address identified in the PIM join message from the PIM BDR, the first unicast message indicating that the PIM router is the merge point between the active multicast tree and the backup multicast tree.

16. The system of claim 14, further comprising a different PIM router, the different PIM router comprising one or more additional processors and at least one additional computer-readable storage medium storing instructions which, when executed by the one or more additional processors, cause the different PIM router to:

receive an active PIM join associated with a second host device and the multicast group, wherein the different PIM router comprises a new merge point for the backup multicast tree and the active multicast tree, wherein the different PIM router is located along a path between the source of the multicast traffic and both the second host device and the PIM BDR;

determine that the different PIM router has previously received the backup PIM join and has a third instance of the backup multicast tree state associated with the multicast group, the third instance of the backup multicast tree state comprising the backup multicast tree;

set the third instance of the backup multicast tree state to a blocking state;

send a third unicast message to the first address identified in the PIM join message from the PIM BDR, the third unicast message indicating that the different PIM router is the new merge point for the active multicast tree and the backup multicast tree; and send a copy of the active PIM join to the PIM router, the copy of the active PIM join identifying a second address associated with the different PIM router and identifying the different PIM router as the new merge point.

17. The system of claim 16, further comprising the PIM router, the PIM router comprising at least one processor and at least one other computer-readable storage medium storing instructions which, when executed by the at least one processor, cause the PIM router to:

in response to receiving the PIM join message sent by the PIM BDR, store the second instance of the backup multicast tree state and a unicast address associated with a destination for unicast communications relating to at least one of the backup multicast tree and the active multicast tree, the unicast address comprising the first address of the PIM BDR;

in response to receiving the active PIM join, update the unicast address to the second address of the different PIM router; and update the second instance of the backup multicast tree state at the PIM router based on the active PIM join.

18. A non-transitory computer-readable storage medium comprising:

instructions stored therein which, when executed by one or more processors, cause the one or more processors to:

receive, at a protocol independent multicast (PIM) backup designated router (BDR), a request from a host device to join a multicast group associated with a source of multicast traffic;

generate, by the PIM BDR in response to the request, a PIM join message that comprises attributes identifying a first address of the PIM BDR and indicating that the PIM join message is a backup PIM join from a backup designated router;

send, by the PIM BDR, the PIM join message towards the source of multicast traffic to a next hop between the PIM BDR and the source of the multicast traffic;

receive, by the PIM BDR, from a PIM router located along a path between the PIM BDR and the source of the multicast traffic, a first unicast message sent to the first address identified in the PIM join message, the first unicast message identifying a second address associated with the PIM router;

store, by the PIM BDR, the second address associated with the PIM router and a route used in delivering the first unicast message to the PIM BDR;

in response to a designated router migration triggering event, change a first instance of a backup multicast tree state at the PIM BDR from blocking to forwarding, the backup multicast tree state being associated with the source of the multicast traffic and the multicast group; and send, by the PIM BDR to the PIM router through the route used in delivering the first unicast message to the PIM BDR, a second unicast message comprising an instruction to change a second instance of the backup multicast tree state at the PIM router from blocking to forwarding.

19. The non-transitory computer-readable storage medium of claim 18, wherein changing the first instance of the backup multicast tree state from blocking to forwarding and sending the second unicast message comprises changing a role of the PIM BDR from backup DR to active PIM DR, wherein the designated router migration triggering event comprises at least one of a failure of a link between the PIM router and a PIM designated router (DR) associated with the multicast group and the source of the multicast traffic, a failure associated with the PIM DR, and a failure associated with one or more interfaces of one or more PIM routers located along an active path between the PIM DR and the PIM router.

20. The non-transitory computer-readable storage medium of claim 18, wherein the PIM router comprises a merge point between an active multicast tree associated with the multicast group and a backup multicast tree associated with the multicast group, the PIM router being located between the PIM BDR and a different PIM router comprising at least one of a first hop router (FHR) connected to the source of the multicast traffic and a rendezvous point (RP) router configured as a root of at least one of the active multicast tree and the backup multicast tree, the non-transitory computer-readable storage medium storing additional instructions which, when executed by the one or more processors, cause the one or more processors to:

receive, by the PIM BDR and from a different PIM router, an active PIM join associated with a second host device and the multicast group, wherein the different PIM router comprises a new merge point for the backup multicast tree and the active multicast tree, wherein the different PIM router is located along a path between the source of the multicast traffic and both the second host device and the PIM BDR, the active PIM join identifying a second address associated with the different PIM router and identifying the different PIM router as the new merge point.

* * * * *